US012094388B2

(12) United States Patent
Zhang et al.

(10) Patent No.: US 12,094,388 B2
(45) Date of Patent: Sep. 17, 2024

(54) SOURCE DRIVING CIRCUIT, SOURCE DRIVING METHOD, DISPLAY DEVICE AND DISPLAY DRIVING METHOD

(71) Applicants: BEIJING BOE DISPLAY TECHNOLOGY CO., LTD., Beijing (CN); BOE TECHNOLOGY GROUP CO., LTD., Beijing (CN)

(72) Inventors: Yinlong Zhang, Beijing (CN); Yanping Liao, Beijing (CN); Jiantao Liu, Beijing (CN); Guohuo Su, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/920,935

(22) PCT Filed: Oct. 22, 2021

(86) PCT No.: PCT/CN2021/125843
§ 371 (c)(1),
(2) Date: Oct. 24, 2022

(87) PCT Pub. No.: WO2023/065338
PCT Pub. Date: Apr. 27, 2023

(65) Prior Publication Data
US 2024/0221586 A1 Jul. 4, 2024

(51) Int. Cl.
*G09G 3/20* (2006.01)

(52) U.S. Cl.
CPC ... *G09G 3/2092* (2013.01); *G09G 2300/0814* (2013.01); *G09G 2300/0828* (2013.01); *G09G 2300/0857* (2013.01); *G09G 2310/0251* (2013.01); *G09G 2310/0275* (2013.01); *G09G 2310/0291* (2013.01); *G09G 2310/08* (2013.01)

(58) Field of Classification Search
CPC ......... G09G 3/3266; G09G 2310/0267; G09G 3/3674; G09G 2300/0857; G09G 2310/0275
See application file for complete search history.

(56) References Cited

U.S. PATENT DOCUMENTS

2023/0186823 A1* 6/2023 Zhang ...................... G09G 3/20 345/55

* cited by examiner

*Primary Examiner* — Robin J Mishler
(74) *Attorney, Agent, or Firm* — IP & T GROUP LLP

(57) ABSTRACT

A source driving circuit includes: a logic and control sub-circuit configured to convert a source data signal into a data signal; a latch sub-circuit configured to, receive the data signal, latch an odd-numbered row of data in an odd-numbered frame, and latch an even-numbered row of data in an even-numbered frame; and an output sub-circuit configured to: receive the odd-numbered row of data in the odd-numbered frame and output the odd-numbered row of data in a first set duration, which is greater than a charging time of sub-pixels in the even-numbered row and less than or equal to twice the charging time; and receive the even-numbered row of data in the even-numbered frame and output the even-numbered row of data in a second set duration, which is greater than a charging time of sub-pixels in the odd-numbered row and less than or equal to twice the charging time.

20 Claims, 13 Drawing Sheets

SOURCE DRIVING CIRCUIT, SOURCE DRIVING METHOD, DISPLAY DEVICE AND DISPLAY DRIVING METHOD

CROSS-REFERENCE TO RELATED APPLICATION

This application is a national phase entry under 35 USC 371 of International Patent Application No. PCT/CN2021/125843 filed on Oct. 22, 2021, which is incorporated herein by reference in its entirety.

TECHNICAL FIELD

The present disclosure relates to the field of display technologies, and in particular, to a source driving circuit, a source driving method, a display device and a display driving method.

BACKGROUND

With the increasing development of display technologies, consumers' requirements for performance of display devices are gradually increasing. In order to enhance product competitiveness of the display device, increasing a resolution and increasing a display frame rate of the display device become two effective manners.

However, as the resolution and the display frame rate increase, a time for supplying a voltage to data lines by a driver chip in the display device is shortened, a charging time of sub-pixels in each row is shortened, and a gray scale displayed by the sub-pixel is different from a target gray scale. As a result, a display effect of the display device is reduced.

SUMMARY

In an aspect, a source driving circuit is provided. The source driving circuit includes a logic and control sub-circuit, a latch sub-circuit and an output sub-circuit.

The logic and control sub-circuit is coupled to a source data signal terminal, a gate start signal terminal, a mode switching signal terminal, an initial latch enable signal terminal and a source output enable signal terminal. The logic and control sub-circuit is configured to: receive a source data signal from the source data signal terminal and convert the source data signal into a data signal; and output a first latch signal, a second latch signal, a first enable signal and a second enable signal according to a gate start signal from the gate start signal terminal, a first mode switching signal from the mode switching signal terminal, an initial latch enable signal from the initial latch enable signal terminal and a source output enable signal from the source output enable signal terminal.

The latch sub-circuit is coupled to the logic and control sub-circuit, and the latch sub-circuit is configured to: receive the data signal from the logic and control sub-circuit; latch an odd-numbered row of data in the data signal in an odd-numbered frame under control of the first latch signal; and latch an even-numbered row of data in the data signal in an even-numbered frame under control of the second latch signal.

The output sub-circuit is coupled to the latch sub-circuit and the logic and control sub-circuit, and the output sub-circuit is configured to: receive the odd-numbered row of data in the odd-numbered frame, and output the odd-numbered row of data in a first set duration under control of the first enable signal, the first set duration being greater than a charging time of sub-pixels in the even-numbered row of a display device to which the source driving circuit applies, and being less than or equal to twice the charging time of the sub-pixels in the even-numbered row; and receive the even-numbered row of data in the even-numbered frame, and output the even-numbered row of data in a second set duration under control of the second enable signal, the second set duration being greater than a charging time of sub-pixels in the odd-numbered row of the display device, and being less than or equal to twice the charging time of the sub-pixels in the odd-numbered row.

In some embodiments, in the odd-numbered frame, the first set duration is twice the charging time of the sub-pixels in the even-numbered row; and/or, in the even-numbered frame, the second set duration is equal to twice the charging time of the sub-pixels in the odd-numbered row.

In some embodiments, the logic and control sub-circuit includes: a mask signal generation module, a latch signal generation module and an enable signal generation module.

The mask signal generation module is coupled to the gate start signal terminal and the mode switching signal terminal. The mask signal generation module is configured to generate a first mask signal and a second mask signal according to the gate start signal and the first mode switching signal.

The latch signal generation module is coupled to the mask signal generation module and the initial latch enable signal terminal. The latch signal generation module is configured to, generate the first latch signal according to the first mask signal and the initial latch enable signal, and generate the second latch signal according to the second mask signal and the initial latch enable signal.

The enable signal generation module is coupled to the mask signal generation module and the source output enable signal terminal. The enable signal generation module is configured to, generate the first enable signal according to the first mask signal and the source output enable signal, and generate the second enable signal according to the second mask signal and the source output enable signal.

In some embodiments, the mask signal generation module includes a distinguishing unit and a generation unit.

The distinguishing unit is coupled to a pulse signal terminal, the gate start signal terminal and the mode switching signal terminal. The distinguishing unit is configured to output a pair of row representation signals and a pair of frame representation signals according to a pulse signal from the pulse signal terminal, the gate start signal and the first mode switching signal. The pair of row representation signals represent the odd-numbered row and the even-numbered row, and the pair of frame representation signals represent the odd-numbered frame and the even-numbered frame.

The generation unit coupled to the distinguishing unit, and the generation unit is configured to generate the first mask signal and the second mask signal according to the pair of row representation signals, the pair of frame representation signals, and an inverted and delayed signal of the source output enable signal.

In some embodiments, the distinguishing unit includes a NAND gate, a first NOT gate, a first flip-flop, a first AND gate, and a second flip-flop.

For the NAND gate, a first input terminal of the NAND gate is coupled to the pulse signal terminal, and a second input terminal of the NAND gate is coupled to the gate start signal terminal.

For first NOT gate, an input terminal of the first NOT gate is coupled to an output terminal of the NAND gate.

For the first flip-flop, an enable terminal of the first flip-flop is coupled to an output terminal of the first NOT gate, a reset terminal of the first flip-flop is coupled to the mode switching signal terminal, a first output terminal and a second output terminal of the first flip-flop are coupled to the generation unit, and an input terminal of the first flip-flop is coupled to the first output terminal of the first flip-flop; the first output terminal of the flip-flop is configured to output the first frame representation signal, and the second output terminal of the first flip-flop is configured to output the second frame representation signal; the first frame representation signal and the second frame representation signal are inverted, and constitute the pair of frame representation signals.

For the first AND gate, a first input terminal of the first AND gate is coupled to the output terminal of the NAND gate, and a second input terminal of the first AND gate is coupled to the mode switching signal terminal.

For the second flip-flop, an enable terminal of the second flip-flop is coupled to the pulse signal terminal, a reset terminal of the second flip-flop is coupled to an output terminal of the first AND gate, a first output terminal and a second output terminal of the second flip-flop are coupled to the generation unit, and an input terminal of the second flip-flop is coupled to the first output terminal of the second flip-flop; the first output terminal of the second flip-flop is configured to output a first row representation signal, and the second output terminal of the second flip-flop is configured to output a second row representation signal; the first row representation signal and the second row representation signal are inverted, and constitute the pair of row representation signals.

In some embodiments, the generation unit includes a multiplier and a third flip-flop.

For the multiplier, a first input terminal and a second input terminal of the multiplier are coupled to the distinguishing unit, and are configured to receive the pair of row representation signals; and a third input terminal and a fourth input terminal of the multiplier are coupled to the distinguishing unit, and are configured to receive the pair of frame representation signals.

For the third flip-flop, an input terminal of the third flip-flop is coupled to an output of the multiplier, an enable terminal of the third flip-flop is configured to receive the inverted and delayed signal of the source output enable signal, and an output terminal of the third flip-flop is configured to output the first mask signal and the second mask signal.

In some embodiments, the latch signal generation module includes a second NOT gate and a second AND gate.

For the second NOT gate, an input terminal of the second NOT gate is coupled to the mask signal generation module.

For the second AND gate, wherein a first input terminal of the second AND gate is coupled to an output terminal of the second NOT gate, a second input terminal of the second AND gate is coupled to the initial latch enable signal terminal, and an output terminal of the second AND gate is configured to output the first latch signal in the odd-numbered frame and output the second latch signal in the even-numbered frame.

In some embodiments, the enable signal generation module includes a signal generator.

For the signal generator, an input terminal of the signal generator is coupled to the source output enable signal terminal, and an enable terminal of the signal generator is coupled to the mask signal generation module; and an output terminal of the signal generator is configured to output the first enable signal and the second enable signal.

In some embodiments, the logic and control sub-circuit is further configured to receive and output the initial latch enable signal and the source output enable signal according to the gate start signal and a second mode switching signal from the mode switching signal terminal.

The latch sub-circuit is further configured to latch the odd-numbered row of data and the even-numbered row of data in the data signal in each frame under control of the initial latch enable signal.

The output sub-circuit is further configured to output the odd-numbered row of data and the even-numbered row of data under control of the source output enable signal.

In some embodiments, the source driving circuit further includes a level conversion and digital-to-analog conversion sub-circuit.

The level conversion and digital-to-analog conversion sub-circuit is coupled to the latch sub-circuit and the output sub-circuit, and the level conversion and digital-to-analog conversion sub-circuit is configured to: receive the odd-numbered row of data in the odd-numbered frame, and perform level conversion and digital-to-analog conversion on the odd-numbered row of data; and receive the even-numbered row of data in the even-numbered frame, and perform the level conversion and digital-to-analog conversion on the even-numbered row of data.

In some embodiments, the source driving circuit further includes an output buffer.

The output buffer is coupled to the latch sub-circuit and the output sub-circuit, and the output buffer is configured to: receive the odd-numbered row of data in the odd-numbered frame, and temporarily store the odd-numbered row of data; and receive the even-numbered row of data in the even-numbered frame, and temporarily store the even-numbered row of data.

In some embodiments, the first set duration is equal to the second set duration.

In another aspect, a source driving method is provided. The source driving method includes:

receiving a source data signal, and converting the source data signal into a data signal in each frame;

in an odd-numbered frame:

generating a first latch signal and a first enable signal according to a gate start signal, a first mode switching signal, an initial latch enable signal and a source output enable signal;

latching an odd-numbered row of data in the data signal under control of the first latch signal; and outputting the odd-numbered row of data in a first set duration under control of the first enable signal; the first set duration being greater than a charging time of sub-pixels in the even-numbered row, and being less than or equal to twice the charging time of the sub-pixels in the even-numbered row;

in an even-numbered frame:

generating a second latch signal and a second enable signal according to the gate start signal, the first mode switching signal, the initial latch enable signal and the source output enable signal;

latching an even-numbered row of data in the data signal under control of the second latch signal; and outputting the even-numbered row of data in a second set duration under control of the second enable signal; the second set duration being greater than a charging time of sub-pixels in the odd-numbered row, and being less than or equal to twice the charging time of the sub-pixels in the odd-numbered row.

In some embodiments, the first set duration is twice the charging time of the sub-pixels in the even-numbered row in the odd-numbered frame; and/or the second set duration is twice the charging time of the sub-pixels in the odd-numbered row in even-numbered frame.

In some embodiments, generating the first latch signal and the first enable signal according to the gate start signal, the first mode switching signal, the initial latch enable signal and the source output enable signal, includes:

generating a first mask signal according to the gate start signal and the first mode switching signal;

generating the first latch signal according to the first mask signal and the initial latch enable signal; and generating the first enable signal according to the first mask signal and the source output enable signal.

Generating the second latch signal and the second enable signal according to the gate start signal, the first mode switching signal, the initial latch enable signal and the source output enable signal, includes:

generating a second mask signal according to the gate start signal and the first mode switching signal;

generating the second latch signal according to the second mask signal and the initial latch enable signal; and generating the second enable signal according to the second mask signal and the source output enable signal.

In some embodiments, generating the first mask signal according to the gate start signal and the first mode switching signal, includes:

receiving a pulse signal, and generating a pair of row representation signals and a pair of frame representation signals according to the pulse signal, the gate start signal and the first mode switching signal, wherein the pair of row representation signals include a first row representation signal and a second row representation signal that are mutually inverted, and the pair of frame representation signals include a first frame representation signal and a second frame representation signal that are mutually inverted; and generating the first mask signal according to the pair of row representation signals, the pair of frame representation signals and an inverted and delayed signal of the source output enable signal.

Generating the second mask signal according to the gate start signal and the first mode switching signal, includes:

receiving the pulse signal, and generating the pair of row representation signals and the pair of frame representation signals according to the pulse signal, the gate start signal and the first mode switching signal, wherein the pair of row representation signals include the first row representation signal and the second row representation signal that are mutually inverted, and the pair of frame representation signals include the first frame representation signal and the second frame representation signal that are mutually inverted; and generating the second mask signal according to the pair of row representation signals, the pair of frame representation signals and the inverted and delayed signal of the source output enable signal.

The first row representation signal is at a low level in a time of the odd-numbered row and at a high level in a time of the even-numbered row; the first frame representation signal is at a low level in a time of the odd-numbered frame and at a high level in a time of the even-numbered frame; or the first row representation signal is at the high level in the time of the odd-numbered row and at the low level in the time of the even-numbered row; the first frame representation signal is at the high level in the time of the odd-numbered frame and at the low level in the time of the even-numbered frame.

In yet another aspect, a display device is provided. The display device includes: a plurality of source driving circuits each being as described in any one of the above embodiments, at least one timing control circuit and a display panel.

The at least one timing control circuit is configured to output the source data signal, the gate start signal, the first mode switching signal, a second mode switching signal, the initial latch enable signal and the source output enable signal. Each timing control circuit is coupled to at least two source driving circuits.

The display panel is coupled to the at least one timing control circuit and the plurality of the source driving circuits.

In some embodiments, the display device includes two timing control circuits. The plurality of source driving circuits are divided into two groups, and each group of source driving circuits are coupled to a timing control circuit in the two timing control circuits. A refresh frequency of the timing control circuit is X, and an amount of image data that is capable of being transmitted in each frame is Y; a target refresh frequency of the display panel is $X_0$, and an amount of target image data that is required for each frame is $Y_0$; and a product of X and Y equals half a product of $X_0$ and $Y_0$ $$\left(X \times Y = \frac{X_0 \times Y_0}{2}\right).$$

In yet another aspect, a display driving method is provided, which is applied to the display device described in any one of the above embodiments. The display driving method includes:

in each frame, sending, by the timing control circuit, the source data signal, the gate start signal, the first mode switching signal, the initial latch enable signal and the source output enable signal to a source driving circuit in the plurality of source driving circuits; and converting, by the source driving circuit, the source data signal into the data signal;

in the odd-numbered frame:

latching, by the source driving circuit, the odd-numbered row of data in the data signal according to the gate start signal, the first mode switching signal, the initial latch enable signal and the source output enable signal; and outputting, by the source driving circuit, the odd-numbered row of data in the first set duration; and controlling, by the timing control circuit, sub-pixels in rows of the display panel to be turned on row by row, and charging the sub-pixels in the rows of the display panel by using the odd-numbered row of data; the charging time of the sub-pixels in the odd-numbered row being the first set duration, and the charging time of the sub-pixels in the even-numbered row being greater than or equal to half the first set duration and less than the first set duration;

in the even-numbered frame:

latching, by the source driving circuit, the even-numbered row of data in the data signal according to the gate start signal, the first mode switching signal, the initial latch enable signal and the source output enable signal; and outputting, by the source driving circuit, the even-numbered row of data in the second set duration; and controlling, by the timing control circuit, the sub-pixels in the rows of the display panel to be turned on row by row, and charging the sub-pixels in the rows of the display panel by using the even-numbered row of data; the charging time of the sub-pixels in the even-numbered row being the second set duration, and the charging time of the sub-pixels in the odd-numbered row being greater than or equal to half the second set duration and less than the second set duration.

In some embodiments, in the odd-numbered frame, for sub-pixels in two adjacent rows, when a charging time of sub-pixels in an odd-numbered row in the two adjacent rows reaches half the first set duration, sub-pixels in an even-numbered row in the two adjacent rows of are turned on for charging; and in the even-numbered frame, for the sub-pixels in the two adjacent rows, when a charging time of the sub-pixels in the even-numbered row in the two adjacent rows reaches half of the second set duration, the sub-pixels in the odd-numbered row are turned on for charging.

BRIEF DESCRIPTION OF THE DRAWINGS

In order to describe technical solutions in the present disclosure more dearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these accompanying drawings. In addition, the accompanying drawings in the following description may be regarded as schematic diagrams, and are not limitations on actual sizes of products, actual processes of methods and actual timings of signals involved in the embodiments of the present disclosure.

DETAILED DESCRIPTION

Figure 1A:
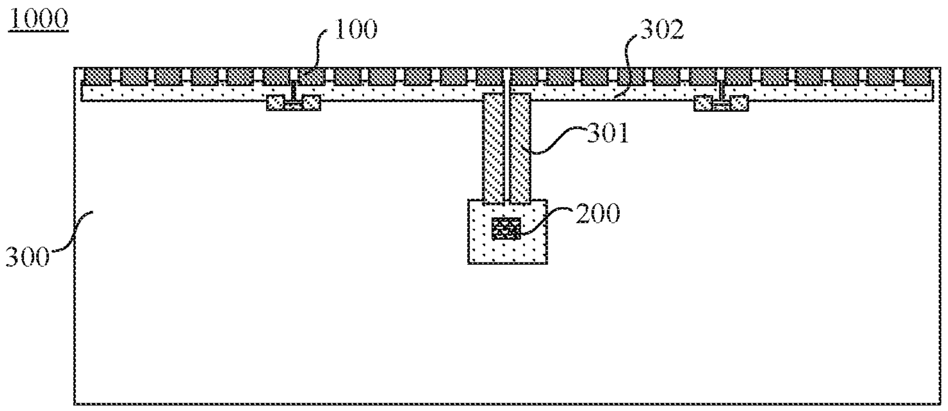
FIG. 1A is a structural diagram of a display device, in accordance with some embodiments.

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the specification and the claims, the term "comprise" and other forms thereof such as the third-person singular form "comprises" and the present participle form "comprising" are construed as an open and inclusive meaning, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features. Thus, a feature defined with "first" or "second" may explicitly or implicitly include one or more of the features. In the description of the embodiments of the present disclosure, the terms "a plurality of", "the plurality of" and "multiple" each mean two or more unless otherwise specified.

In the description of some embodiments, terms such as "coupled" and "connected" and their derivatives may be used. For example, the term "connected" may be used in the description of some embodiments to indicate that two or more components are in direct physical or electrical contact with each other. As another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the content herein.

The phrase "applicable to" or "configured to" used herein means an open and inclusive expression, which does not exclude devices that are applicable to or configured to perform additional tasks or steps.

In addition, the phrase "based on" used is meant to be open and inclusive, since a process, step, calculation or other action that is "based on" one or more of the stated conditions or values may, in practice, be based on additional conditions or value exceeding those stated.

As used herein, terms such as "about", "substantially" or "approximately" include a stated value and an average value within an acceptable range of deviation of a particular value. The acceptable range of deviation is determined by a person of ordinary skill in the art in view of the measurement in question and the error associated with the measurement of a particular quantity (i.e., the limitations of the measurement system).

As used herein, the term "equal" includes a stated condition and a condition similar to the stated condition. A range of the similar condition is within an acceptable range of deviation of a particular value. The acceptable range of deviation is determined by a person of ordinary skill in the art in view of the measurement in question and the error associated with the measurement of a particular quantity (i.e., the limitations of the measurement system). For example, the term "equal" includes absolute equality and approximate equality, and an acceptable range of deviation of the approximate equality may be, for example, a difference between two equals of less than or equal to 5% of either of the two equals.

Figure 1B:
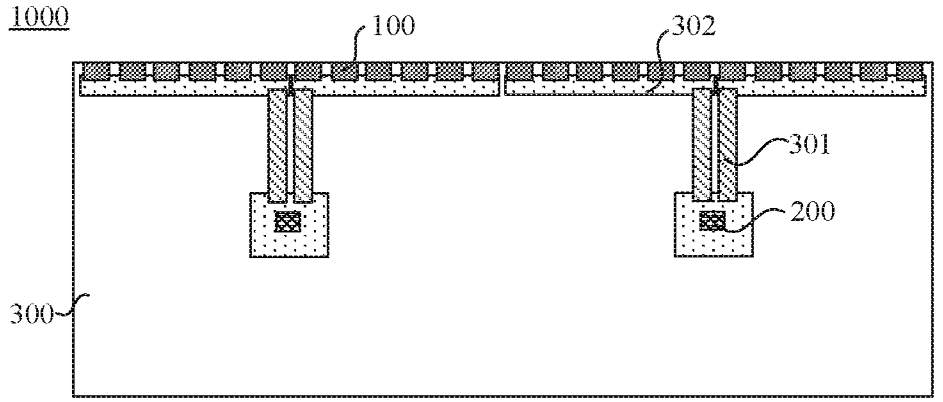
FIG. 1B is a structural diagram of another display device, in accordance with some embodiments.

As shown in FIGS. 1A and 1B, some embodiments of the present disclosure provide a display device 1000. The display device 1000 may be any component having a display function, such as a television, a digital camera, a mobile phone, a watch, a tablet computer, a notebook computer, or a navigator.

The display device 1000 includes a plurality of source driving circuits 100, at least one timing control circuit 200 and a display panel 300.

The timing control circuit 200 is configured to output a source data signal WDT, a gate start signal WGSP, a first mode switching signal WOD1, a second mode switching signal WOD2, an initial latch enable signal WLA and a source output enable signal WSOE. Each timing control circuit 200 is coupled to at least two source driving circuits 100.

In some examples, as shown in FIG. 1A, the display device 1000 may include one timing control circuit 200. In some other examples, as shown in FIG. 1B, the display device 1000 may include a plurality of timing control circuit 200. The number of the timing control circuits 200 is not limited in the embodiments of the present disclosure, as long as normal display of the display device 1000 can be ensured.

Figure 11:
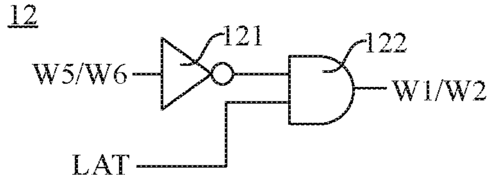
FIG. 11 is a circuit diagram of a latch signal generation module, in accordance with some embodiments.

In some examples, as shown in FIG. 11, the display device 1000 may include twenty-four source driving circuits. Each timing control circuit 200 may be coupled to twelve source driving circuits 100.

The display panel 300 is coupled to the at least one timing control circuit 200 and the plurality of source driving circuits 100.

In some examples, as shown in FIGS. 1A and 1B, the display device 1000 may further include a plurality of flexible circuit boards 301, a plurality of printed circuit boards 302 and a plurality of chip-on-films (not shown in FIGS. 1A and 1B). The display panel 300 is coupled to the at least one timing control circuit 200 and the plurality of source driving circuits 100 by using the flexible circuit boards 301, the printed circuit boards 302 and the chip-on-films.

For example, the source driving circuits 100 may each be located on one chip-on-film, chip-on-films may be bonded on one printed circuit board 302, each timing control circuit 200 may be coupled to printed circuit board(s) 302, and two printed circuit board 302 may be coupled by a flexible circuit board 301.

It can be understood that, the number of the source driving circuits 100 in FIGS. 1A and 1B is only exemplary, and the number of the source driving circuits 100 of the display device 1000 in the embodiments of the present disclosure is not limited thereto.

Figure 2:
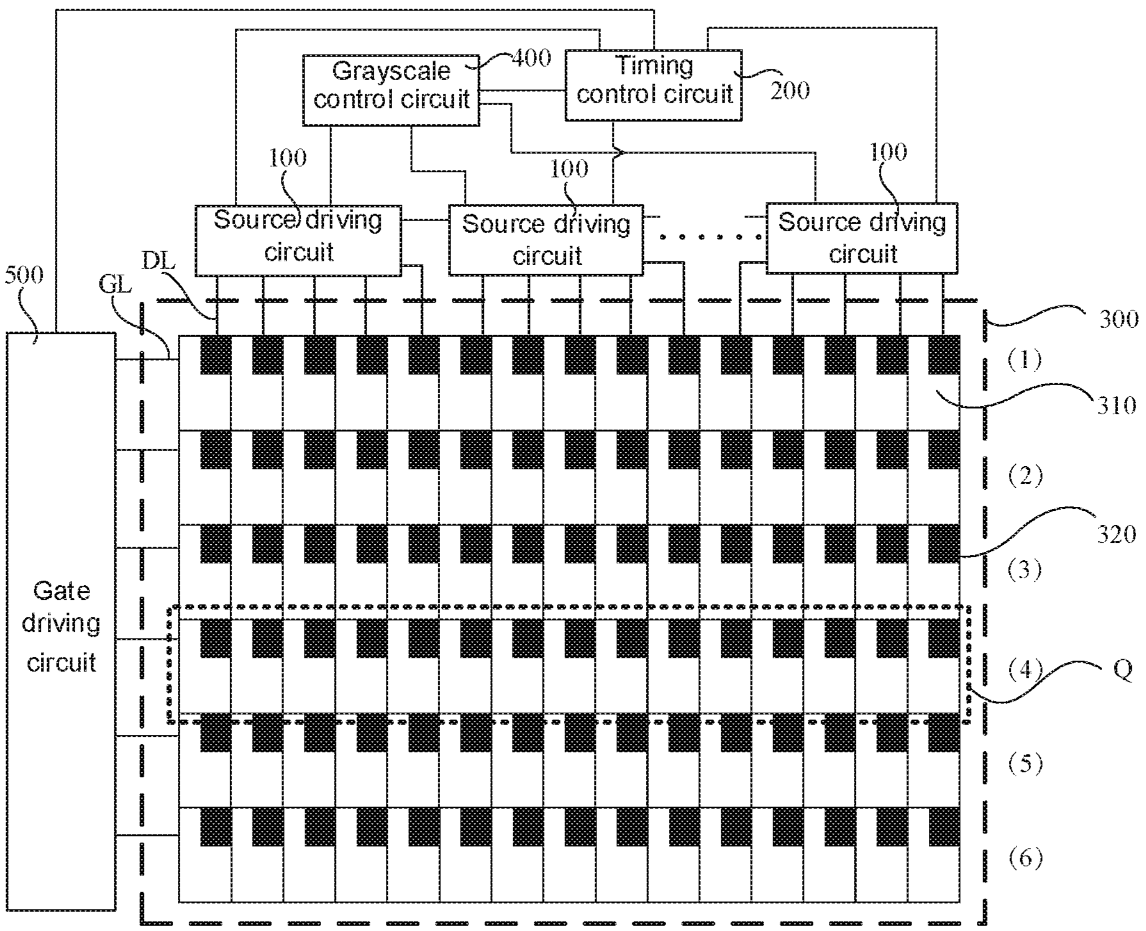
FIG. 2 is a structural diagram of yet another display device, in accordance with some embodiments.

For example, as shown in FIG. 2, the display panel 300 may include a plurality of sub-pixels 310, a plurality of data lines DL and a plurality of gate lines GL. Each sub-pixel 310 may include a pixel driving circuit 320. The pixel driving circuit 320 is generally composed of electronic devices such as thin film transistor(s) (abbreviated as TFT), and capacitor(s) (abbreviated as C).

The plurality of sub-pixels 310 may be arranged in multiple rows along a column direction. For example, the dotted box Q in FIG. 2 represents a row of sub-pixels. For example, in an order from top to bottom, the multiple rows of sub-pixels are labeled with (1) to (6) in sequence. Rows of sub-pixels labeled with (1), (3) and (5) are odd-numbered rows of sub-pixels, and rows of sub-pixels labeled with (2), (4) and (6) are even-numbered rows of sub-pixels.

The source driving circuits 100 may provide data to sub-pixels 310 in each row through the plurality of data lines DL.

In some examples, as shown in FIG. 2, the display device 1000 may further include a grayscale control circuit 400 and a gate driving circuit 500.

For example, the grayscale control circuit 400 is coupled to the timing control circuit 200 and the source driving circuits 100. The grayscale control circuit 400 may be configured to provide a gamma signal to the source driving circuits 100 according to image data from the timing control circuit 200.

For example, the gate driving circuit 500 may be coupled to the timing control circuit 200. The timing control circuit 200 may control the gate driving circuit 500 to provide gate scan signals to sub-pixels 310 in respective rows through the plurality of gate lines GL, so as to control a charging time of sub-pixels in each row.

In some embodiments, as shown in FIG. 1B, the display device 1000 includes two timing control circuits 200. The plurality of source driving circuits 100 are divided into two groups, and each group of source driving circuits 100 are coupled to one timing control circuit 200.

A refresh frequency of the timing control circuit 200 is X, and an amount of image data that is capable of being transmitted in each frame is Y; a target refresh frequency of the display panel 300 is $X_0$ and an amount of target image data that is required for each frame is $Y_0$; and $$X \times Y = \frac{X_0 \times Y_0}{2}.$$

The display device 1000 includes the two timing control circuits 200. In this way, the refresh frequency X of the timing control circuit 200 may be half the target refresh frequency $X_0$, so that the amount of the image data Y that is capable of being transmitted in each frame is the same as the amount of the target image data $Y_0$ that is required for each frame; or the refresh frequency X of the timing control circuit 200 may be the same as the target refresh frequency $X_0$, so that the amount of the image data Y that is capable of being transmitted in each frame is half the amount of the target image data $Y_0$ that is required for each frame. Therefore, the display device has low performance requirements on the timing control circuit 200, and the timing control circuit 200 is easy to get, which helps reduce the manufacturing costs of the timing control circuit 200. As a result, the manufacturing costs of the display device 1000 are reduced.

For example, in a case where the target refresh frequency of the display panel 300 is 120 Hz, the refresh frequency of the timing control circuit 200 may be 60 Hz.

Figure 3:
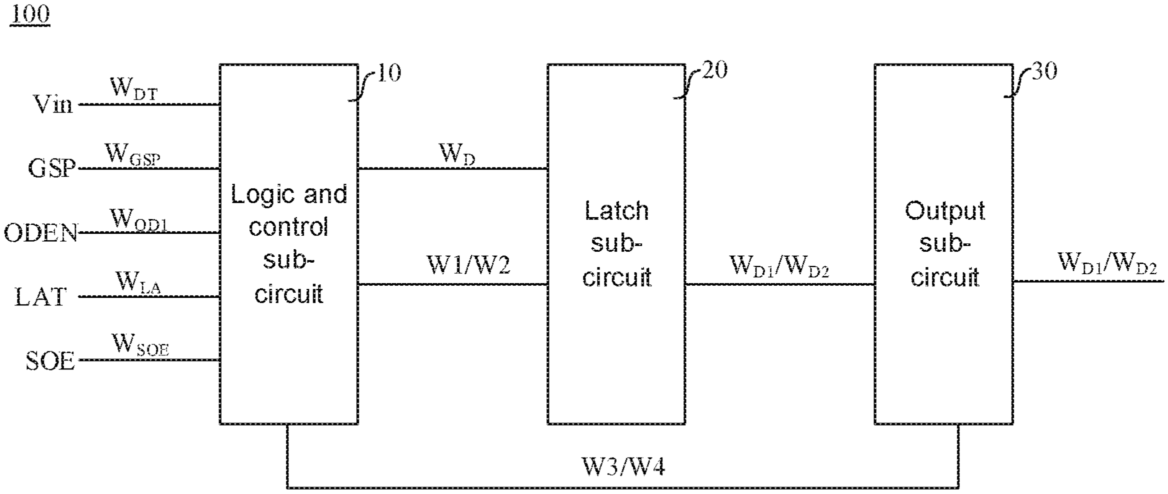
FIG. 3 is a configuration diagram of a source driving circuit, in accordance with some embodiments.

As shown in FIG. 3, some embodiments of the present disclosure provide the source driving circuit 100. The source driving circuit 100 includes a logic and control sub-circuit 10, a latch sub-circuit 20 and an output sub-circuit 30.

The logic and control sub-circuit 10 is coupled to a source data signal terminal Vin, a gate start signal terminal GSP, a mode switching signal terminal ODEN, an initial latch enable signal terminal LAT and a source output enable signal terminal SOE. The logic and control sub-circuit 10 is configured to: receive the source data signal $W_{DT}$ from the source data signal terminal Vin and convert the source data signal $W_{DT}$ into a data signal $W_D$; and output a first latch signal W1, a second latch signal W2, a first enable signal W3 and a second enable signal W4 according to the gate start signal $W_{GSP}$ from the gate start signal terminal GSP, the first mode switching signal $W_{OD1}$ from the mode switching signal terminal ODEN, the initial latch enable signal $W_{LA}$ from the initial latch enable signal terminal LAT and the source output enable signal $W_{SOE}$ from the source output enable signal terminal SOE.

For example, converting the source data signal $W_{DT}$ into the data signal $W_D$ may be realized by means such as data inversion, serial-to-parallel conversion, data sampling to process the source data signal $W_{DT}$, so as to convert the source data signal $W_{DT}$ into the data signal $W_D$. The means of converting the source data signal $W_{DT}$ into the data signal $W_D$ are not limited in the embodiments of the present disclosure.

The latch sub-circuit 20 is coupled to the logic and control sub-circuit 10. The latch sub-circuit 20 is configured to: receive the data signal $W_D$ from the logic and control sub-circuit 10; latch an odd-numbered row of data $W_{D1}$ in the data signal $W_D$ in an odd-numbered frame under control of the first latch signal W1; and latch an even-numbered row of data $W_{D2}$ in the data signal $W_D$ in an even-numbered frame under control of the second latch signal W2.

Figure 4A:
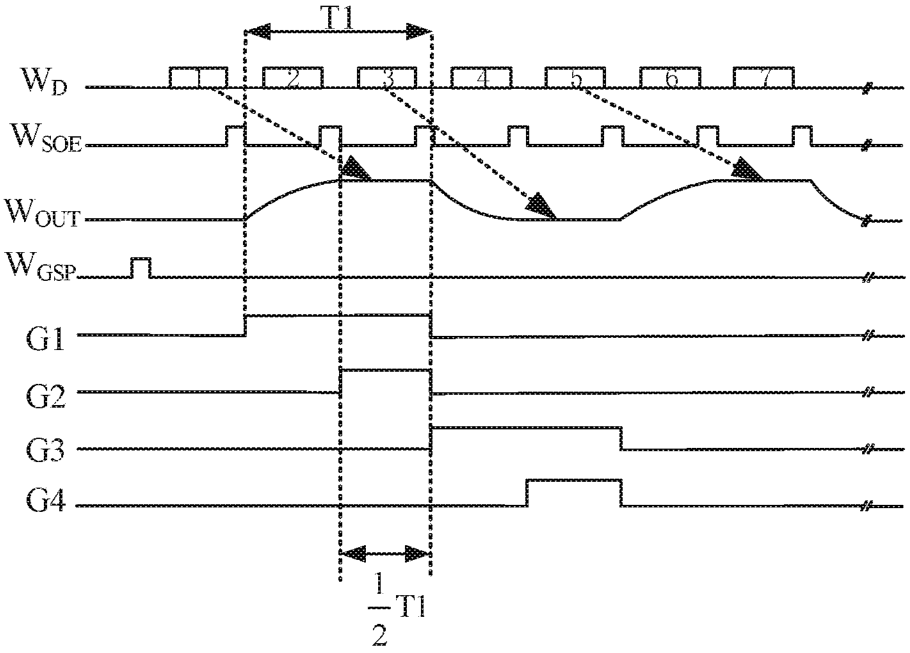
FIG. 4A is a timing diagram of signals in an odd-numbered frame, in accordance with some embodiments.
Figure 4B:
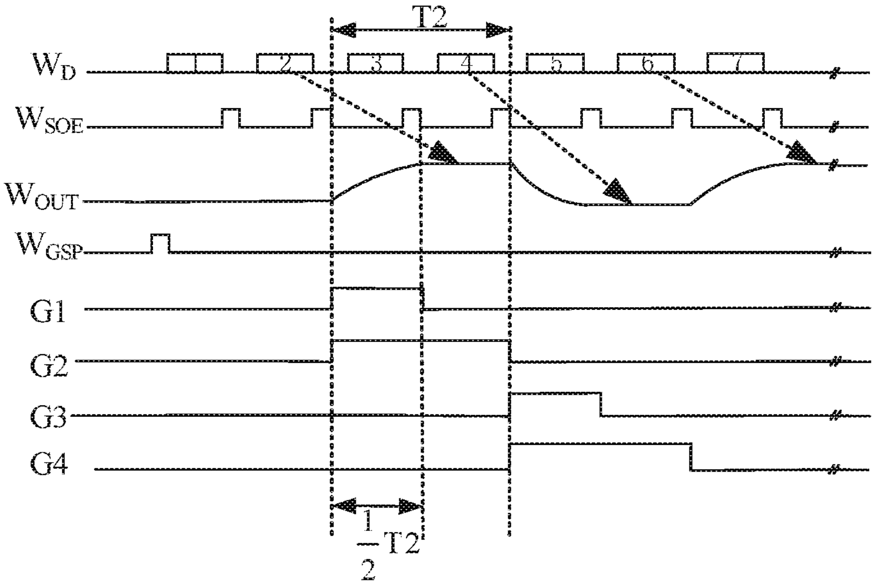
FIG. 4B is a timing diagram of signal in an even-numbered frame, in accordance with some embodiments.

The output sub-circuit 30 is coupled to the logic and control sub-circuit 10 and the latch sub-circuit 20. Referring to FIG. 4A, the output sub-circuit 30 is configured to receive the odd-numbered row of data $W_{D1}$ in the odd-numbered frame, and output the odd-numbered row of data $W_{D1}$ in a first set duration T1 under control of the first enable signal W3. The first set duration T1 is greater than a charging time of sub-pixels 310 in the even-numbered row, and is less than or equal to twice the charging time of the sub-pixels 310 in the even-numbered row. Referring to FIG. 4B, the output sub-circuit 30 is further configured to receive the even-numbered row of data $W_{D2}$ in the even-numbered frame, and output the even-numbered row of data $W_{D2}$ in a second set duration T2 under control of the second enable signal W4. The second set duration T2 is greater than a charging time of sub-pixels 310 in the odd-numbered row, and is less than or equal to twice the charging time of the sub-pixels 310 in the odd-numbered row.

For example, the source data signal $W_{DT}$, the gate start signal $W_{GSP}$, the first mode switching signal $W_{OD1}$, the initial latch enable signal Wu and the source output enable signal $W_{SOE}$ may be provided by the timing control circuit 200.

For example, the gate start signal $W_{GSP}$ may serve to indicate the start of each frame, that is, the gate driving circuit 500 starts to provide gate scan signals for sub-pixels 310 in respective rows through the plurality of gate lines GL.

For example, a variation of an output voltage of the source driving circuit 100 in the odd-numbered frame may be as shown in a waveform of the $W_{OUT}$ in FIG. 4A; and a variation of the output voltage of the source driving circuit 100 in the even-numbered frame may be as shown in a waveform of the $W_{OUT}$ in FIG. 4B.

In the odd-numbered frame, the odd-numbered row of data $W_{D1}$ in the data voltage $W_D$ (e.g., 1, 3, 5 and 7 in FIG. 4A) are output; in the even-numbered frame, the even-numbered row of data $W_{D2}$ in the data voltage $W_D$ (e.g., 2, 4 and 6 in FIG. 4B) are output.

For example, in FIG. 4A, a time between two adjacent falling edges in the source output enable signal $W_{SOE}$ is the charging time of the even-numbered row of sub-pixels.

For example, in FIG. 4B, a time between two adjacent falling edges in the source output enable signal $W_{SOE}$ is the charging time of the odd-numbered row of sub-pixels.

It will be noted that, in FIGS. 4A and 4B, G1 to G4 represent gate line signals. When G1 to G4 signals are at a high level, gate lines GL corresponding to G1 to G4 transmit high-level signals, and sub-pixels 310 connected to the gate lines GL are charged.

In some embodiments of the present disclosure, the source driving circuit 100 outputs the odd-numbered row of data $W_{D1}$ in the first set duration T1 in the odd-numbered frame, the first set duration T1 is greater than the charging time of the sub-pixels in the even-numbered row, and is less than or equal to twice the charging time of the sub-pixels in the even-numbered row; and the source driving circuit 100 outputs the even-numbered row of data $W_{D2}$ in the second set duration T2 in the even-numbered frame, the second set duration T2 is greater than the charging time of the sub-pixels in the odd-numbered row, and is less than or equal to twice the charging time of the sub-pixels in the odd-numbered row. Therefore, the charging time of the sub-pixels 310 in the odd-numbered row in the odd-numbered frame is relatively long, which helps ensure that the sub-pixels 310 in the odd-numbered row can display a target gray scale in the odd-numbered frame; and the charging time of the sub-pixels 310 in the even-numbered row in the even-numbered frame is also relatively long, which helps ensure that the sub-pixels 310 in the even-numbered row can display a target gray scale in the even-numbered frame.

In some embodiments, referring to FIG. 4A, in the odd-numbered frame, the first set duration T1 is twice the charging time of the sub-pixels in the even-numbered row. In this case, the charging time of the sub-pixels 310 in the odd-numbered row in the odd-numbered frame is longer. When the charging is completed, the output voltage of the source driving circuit 100 to the sub-pixels in the odd-numbered row in the odd-numbered frame can reach a maximum value and will not change, thereby further ensuring that the sub-pixels 310 in the odd-numbered row can display the target gray scale in the odd-numbered frame.

In some other embodiments, referring to FIG. 4B, in the even-numbered frame, the second set duration T2 is twice the charging time of the sub-pixels in the odd-numbered row. In this case, the charging time of the sub-pixels 310 in the even-numbered row in the even-numbered frame is longer. When the charging is completed, the output voltage of the source driving circuit 100 to the sub-pixels in the even-numbered row in the even-numbered frame can reach a maximum value and will not change, thereby further ensuring that the sub-pixels 310 in the even-numbered row can display the target gray scale in the even-numbered frame.

In yet some other embodiments, in the odd-numbered frame, the first set duration T1 is twice the charging time of the sub-pixels in the even-numbered row; and in the even-numbered frame, the second set duration T2 is twice the charging time of the sub-pixels in the odd-numbered row. In this case, the charging time of the sub-pixels 310 in the odd-numbered row in the odd-numbered frame is longer, and the charging time of the sub-pixels 310 in the even-numbered row in the even-numbered frame is also longer. When the charging is completed, the output voltage of the source driving circuit 100 to the sub-pixels in the odd-numbered row in the odd-numbered frame can reach the maximum value, and the output voltage of the source driving circuit 100 to the sub-pixels in the even-numbered row in the even-numbered frame can reach the maximum value, and they both do not change. Thus, it is further ensured that the sub-pixels 310 in the odd-numbered row can display the target gray scale in the odd-numbered frame, and the sub-pixels 310 in the even-numbered row can display the target gray scale in the even-numbered frame.

In some embodiments, the first set duration T1 is equal to the second set duration T2. In this case, the charging time of the sub-pixels 310 in the odd-numbered row in the odd-numbered frame and the charging time of the sub-pixels 310 in the even-numbered row in the even-numbered frame are the same, and a charging time of the sub-pixels 310 in the even-numbered row in the odd-numbered frame and a charging time of the sub-pixels in the odd-numbered row in the even-numbered frame are the same. This helps simplify a circuit configuration of the source driving circuit 100, and reduce the design difficulty of the source driving circuit 100, thereby reducing manufacturing costs of the source driving circuit 100.

For example, the first set duration T1 and the second set duration T2 may both be 3.7 microseconds. The charging time of the sub-pixels in the even-numbered row may be 1.85 microseconds in the odd-numbered frame. The charging time of the sub-pixels in the odd-numbered row may be 1.85 microseconds in the even-numbered frame.

Of course, in the embodiments of the present disclosure, the first set duration T1, the second set duration T2, the charging time of the sub-pixels in the even-numbered row and the charging time of the sub-pixels in the odd-numbered row are not limited thereto.

Figure 5:
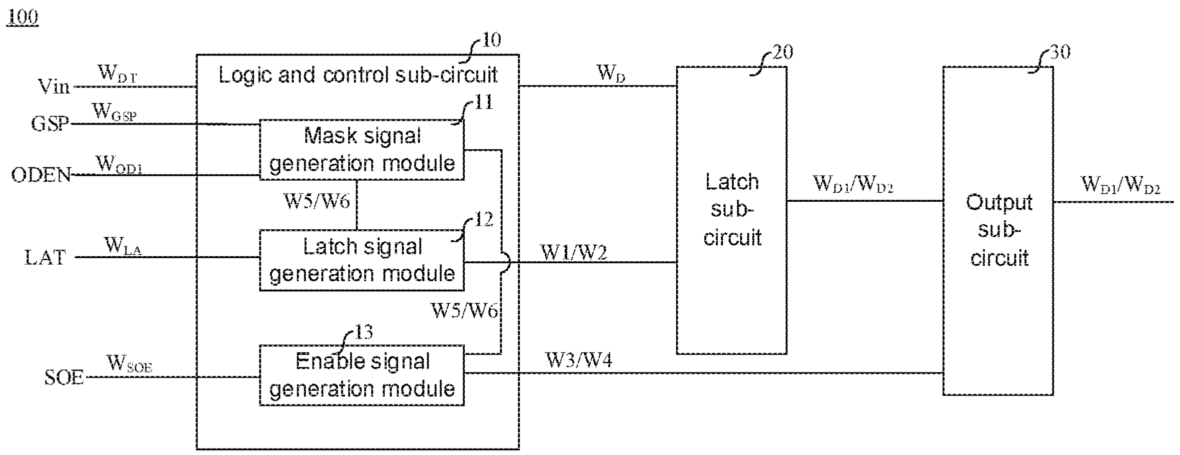
FIG. 5 is a configuration diagram of another source driving circuit, in accordance with some embodiments.

In some embodiments, as shown in FIG. 5, the logic and control sub-circuit 10 includes a mask signal generation module 11, a latch signal generation module 12 and an enable signal generation module 13. The mask signal generation module 11 is coupled to the gate start signal terminal GSP and the mode switching signal terminal ODEN. The mask signal generation module 11 is configured to generate a first mask signal W5 and a second mask signal W6 according to the gate start signal $W_{GSP}$ and the first mode switching signal $W_{OD1}$.

The latch signal generation module 12 is coupled to the mask signal generation module 11 and the initial latch enable signal terminal LAT. The latch signal generation module 12 is configured to, generate the first latch signal W1 according to the first mask signal W5 and the initial latch enable signal $W_{LA}$, and generate the second latch signal W2 according to the second mask signal W6 and the initial latch enable signal $W_{LA}$.

The enable signal generation module 13 is coupled to the mask signal generation module 11 and the source output enable signal terminal SOE. The enable signal generation module 13 is configured to, generate the first enable signal W3 according to the first mask signal W5 and the source output enable signal $W_{SOE}$, and generate the second enable signal W4 according to the second mask signal W6 and the source output enable signal $W_{SOE}$.

Figure 6:
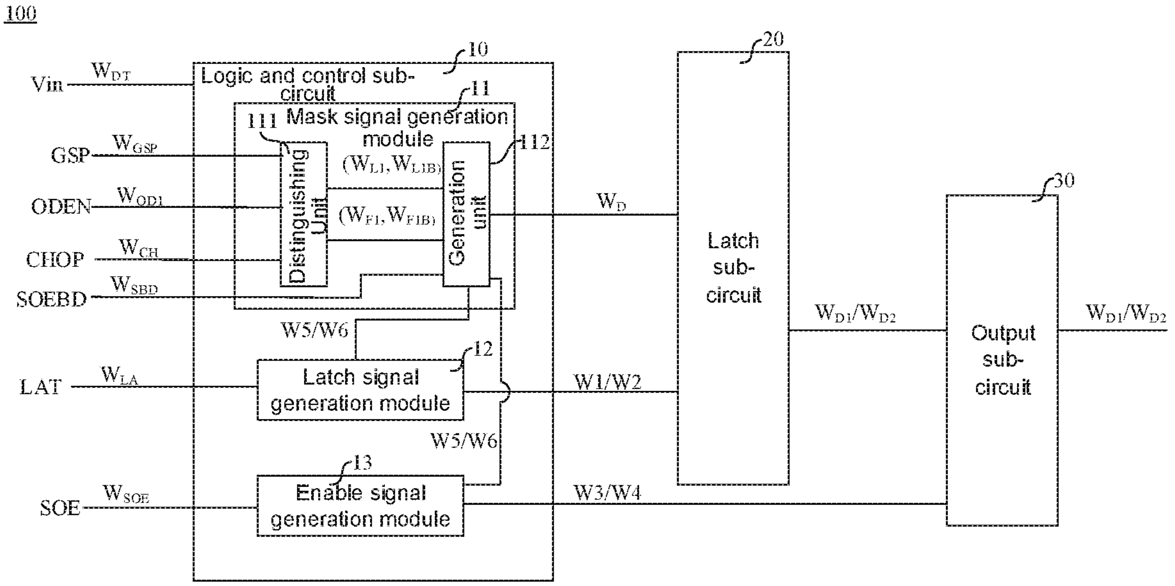
FIG. 6 is a configuration diagram of yet another source driving circuit, in accordance with some embodiments.
Figure 7:
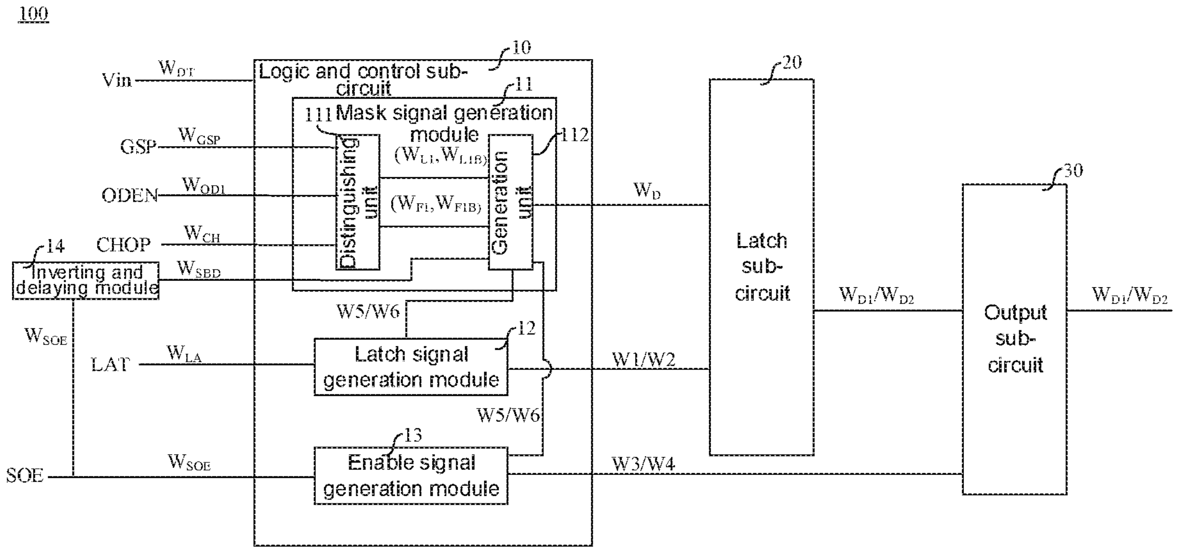
FIG. 7 is a configuration diagram of yet another source driving circuit, in accordance with some embodiments.

In some embodiments, as shown in FIGS. 6 and 7, the mask signal generation module 11 includes a distinguishing unit 111 and a generation unit 112.

The distinguishing unit 111 is coupled to a pulse signal terminal CHOP, the gate start signal terminal GSP and the mode switching signal terminal ODEN. The distinguishing unit 111 is configured to output a pair of row representation signals ($W_{L1}$, $W_{L1B}$) and a pair of frame representation signals ($W_{F1}$, $W_{F1B}$) according to a pulse signal $W_{CH}$ from the pulse signal terminal CHOP, the gate start signal $W_{GSP}$ and the first mode switching signal $W_{OD1}$. The pair of row representation signals (Wu, $W_{L1B}$) represent the odd-numbered row and the even-numbered row, and the pair of frame representation signals ($W_{F1}$, $W_{F1B}$) represent the odd-numbered frame and the even-numbered frame.

For example, a rising edge of the pulse signal $W_{CH}$ from the pulse signal terminal CHOP may be at a same time as a rising edge of the source output enable signal $W_{SOE}$.

For example, the first row representation signal $W_{L1}$ is at a low level in a time of the odd-numbered row and at a high level in a time of the even-numbered row; the first frame representation signal $W_{F1}$ is at a low level in a time of the odd-numbered frame and at a high level in a time of the even-numbered frame.

Alternatively, the first row representation signal $W_{L1}$ is at the high level in the time of the odd-numbered row and at the low level in the time of the even-numbered row; the first frame representation signal $W_{F1}$ is at the high level in the time of the odd frame and at the low level in the time of the even-numbered frame.

The generation unit 112 is coupled to the distinguishing unit 111. The generation unit 112 is configured to generate the first mask signal W5 and the second mask signal W6 according to the pair of row representation signals ($W_{L1}$, $W_{L1B}$), the pair of frame representation signals ($W_{F1}$, $W_{F1B}$) and an inverted and delayed signal $W_{SBD}$ of the source output enable signal $W_{SOE}$.

For example, the timing control circuit 200 may generate the inverted and delayed signal $W_{SBD}$ of the source output enable signal $W_{SOE}$ and then provide this signal to an inverted and delayed signal terminal SOEBD of the source driving circuit 100. Based on this, referring to FIG. 6, the generation unit 112 may be coupled to the inverted and delayed signal terminal SOEBD to receive the inverted and delayed signal $W_{SBD}$ of the source output enable signal $W_{SOE}$.

For example, the source driving circuit 100 may also obtain the inverted and delayed signal $W_{SBD}$ of the source output enable signal $W_{SOE}$ by performing an inversion and delay processing on the source output enable signal $W_{SOE}$. Referring to FIG. 7, the source driving circuit 100 may further include an inverting and delaying module 14. The inverting and delaying module 14 is coupled to the source output enable signal terminal SOE and the generation unit 112. The inverting and delaying module 14 is configured to: receive the source output enable signal $W_{SOE}$ from the source output enable signal terminal SOE; perform data inversion and delay processing on the source output enable signal $W_{SOE}$ to obtain the inverted and delayed signal $W_{SBD}$ of the source output enable signal $W_{SOE}$; and output the inverted and delayed signal $W_{SED}$ to the generation unit 112.

For example, the inverting and delaying module 14 may include a resistor-capacitance (RC) delay circuit. Of course, the inverting and delaying module 14 in the embodiments of the present disclosure is not limited thereto.

Figure 8:
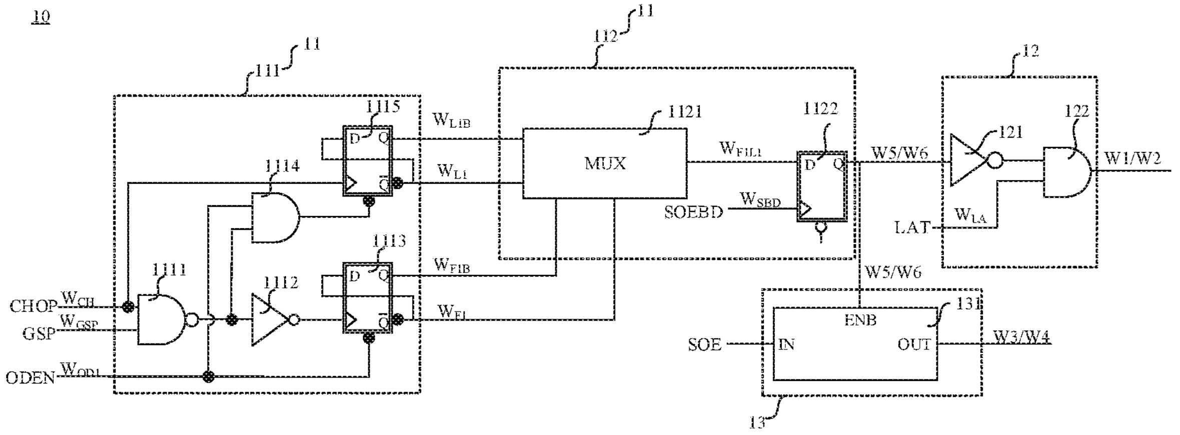
FIG. 8 is a circuit diagram of a logic and control sub-circuit, in accordance with some embodiments.
Figure 9:
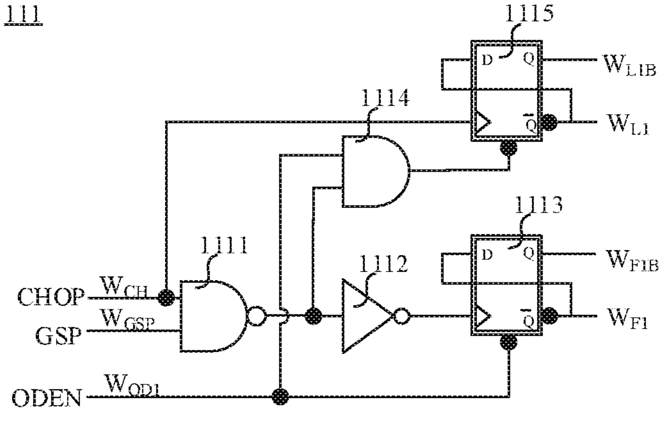
FIG. 9 is a circuit diagram of a distinguishing unit, in accordance with some embodiments.

For example, as shown in FIGS. 8 and 9, the distinguishing unit 111 includes a NAND gate 1111, a first NOT gate 1112, a first flip-flop 1113, a first AND gate 1114, and a second flip-flop 1115.

For the NAND gate 1111, a first input terminal of the NAND gate 1111 is coupled to the pulse signal terminal CHOP, and a second input terminal of the NAND gate 1111 is coupled to the gate start signal terminal GSP.

For the first NOT gate 1112, an input terminal of the first NOT gate 1112 is coupled to an output terminal of the NAND gate 1111.

For the first flip-flop 1113, an enable terminal of the first flip-flop 1113 is coupled to an output terminal of the first NOT gate 1112, a reset terminal of the first flip-flop 1113 is coupled to the mode switching signal terminal ODEN, a first output terminal Q and a second output terminal Q of the first flip-flop 1113 are coupled to the generation unit 112, and an input terminal D of the first flip-flop 1113 is coupled to the first output terminal Q of the first flip-flop 1113. The first output terminal Q of the first flip-flop 1113 is configured to output the first frame representation signal $W_{F1}$, and the second output terminal Q of the first flip-flop 1113 is configured to output the second frame representation signal $W_{F1B}$. The first frame representation signal $W_{F1}$ and the second frame representation signal $W_{F1B}$ are inverted, and constitute the pair of frame representation signals ($W_{F1}$, $W_{F1B}$).

For the first AND gate 1114, a first input terminal of the first AND gate 1114 is coupled to the output terminal of the NAND gate 1111, and a second input terminal of the first AND gate 1114 is coupled to the mode switching signal terminal ODEN.

For the second flip-flop 1115, an enable terminal of the second flip-flop 1115 is coupled to the pulse signal terminal CHOP; a reset terminal of the second flip-flop 1115 is coupled to an output terminal of the first AND gate 1114, an first output terminal $\overline{Q}$ and a second output terminal Q of the second flip-flop 1115 are coupled to the generation unit 112, and an input terminal D of the second flip-flop 1115 is coupled to the first output terminal $\overline{Q}$ of the second flip-flop 1115. The first output terminal $\overline{Q}$ of the second flip-flop 1115 is configured to output the first row representation signal $W_{L1}$, and the second output terminal Q of the second flip-flop 1115 is configured to output the second row representation signal $W_{L1B}$. The first row representation signal Wu and the second row representation signal $W_{L1B}$ are inverted, and constitute the pair of row representation signals (Wu, $W_{L1B}$).

For example, the first flip-flop 1113 and the second flip-flop 1115 may be edge D type flip-flops. Enable terminals of the first flip-flop 1113 and the second flip-flop 1115 are valid at rising edges of respective signals transmitted thereto.

Figure 10:
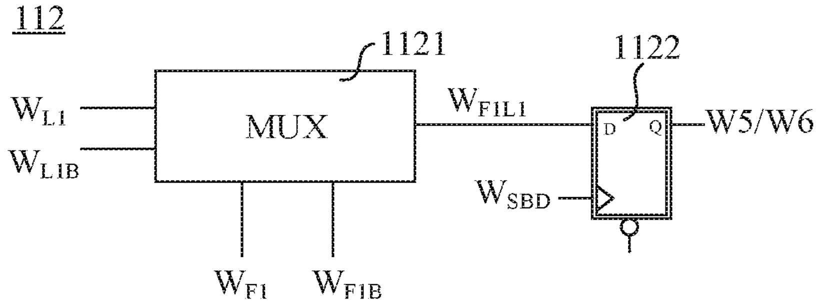
FIG. 10 is a circuit diagram of a generation unit, in accordance with some embodiments.

For example, as shown in FIGS. 8 and 10, the generation unit 112 includes a multiplier (MUX) 1121 and a third flip-flop 1122.

A first input terminal and a second input terminal of the multiplier 1121 are coupled to the distinguishing unit 111, and are configured to receive the pair of row representation signals ($W_{L1}$, $W_{L1B}$). A third input terminal and a fourth input terminal of the multiplier 1121 are coupled to the distinguishing unit 111, and are configured to receive the pair of frame representation signals ($W_{F1}$, $W_{F1B}$).

For the third flip-flop 1122, an input terminal D of the third flip-flop 1122 is coupled to an output terminal of the multiplier 1121. An enable terminal of the third flip-flop 1122 is configured to receive the inverted and delayed signal $W_{SBD}$ of the source output enable signal $W_{SOE}$, and an output terminal Q of the third flip-flop 1122 is configured to output the first mask signal W5 and the second mask signal W6.

For example, the third flip-flop 1122 may be an edge D type flip-flop. The enable terminal of the third flip-flop 1122 is valid at a rising edge of a signal transmitted thereto.

For example, as shown in FIGS. 8 and 11, the latch signal generation module 12 includes a second NOT gate 121 and a second AND gate 122.

For the second NOT gate 121, an input terminal of the second NOT gate 121 is coupled to the mask signal generation module 11.

For the second AND gate 122, a first input terminal of the second AND gate 122 is coupled to an output terminal of the second NOT gate 121, and a second input terminal of the second AND gate 122 is coupled to the initial latch enable signal terminal LAT. An output terminal of the second AND gate 122 is configured to output the first latch signal W1 in the odd-numbered frame and the second latch signal W2 in the even-numbered frame.

Figure 12:
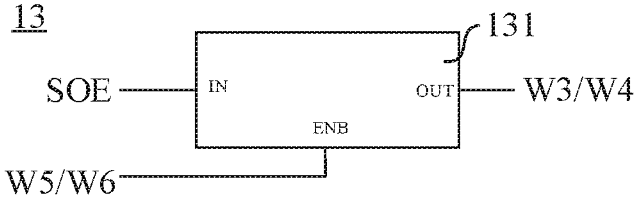
FIG. 12 is a circuit diagram of an enable signal generation module, in accordance with some embodiments.

For example, as shown in FIGS. 8 and 12, the enable signal generation module 13 includes a signal generator 131.

An input terminal IN of the signal generator 131 is coupled to the source output enable signal terminal SOE, and an enable terminal ENB of the signal generator 131 is coupled to the mask signal generation module 11. An output terminal OUT of the signal generator 131 is configured to output the first enable signal W3 and the second enable signal W4.

Figure 13A:
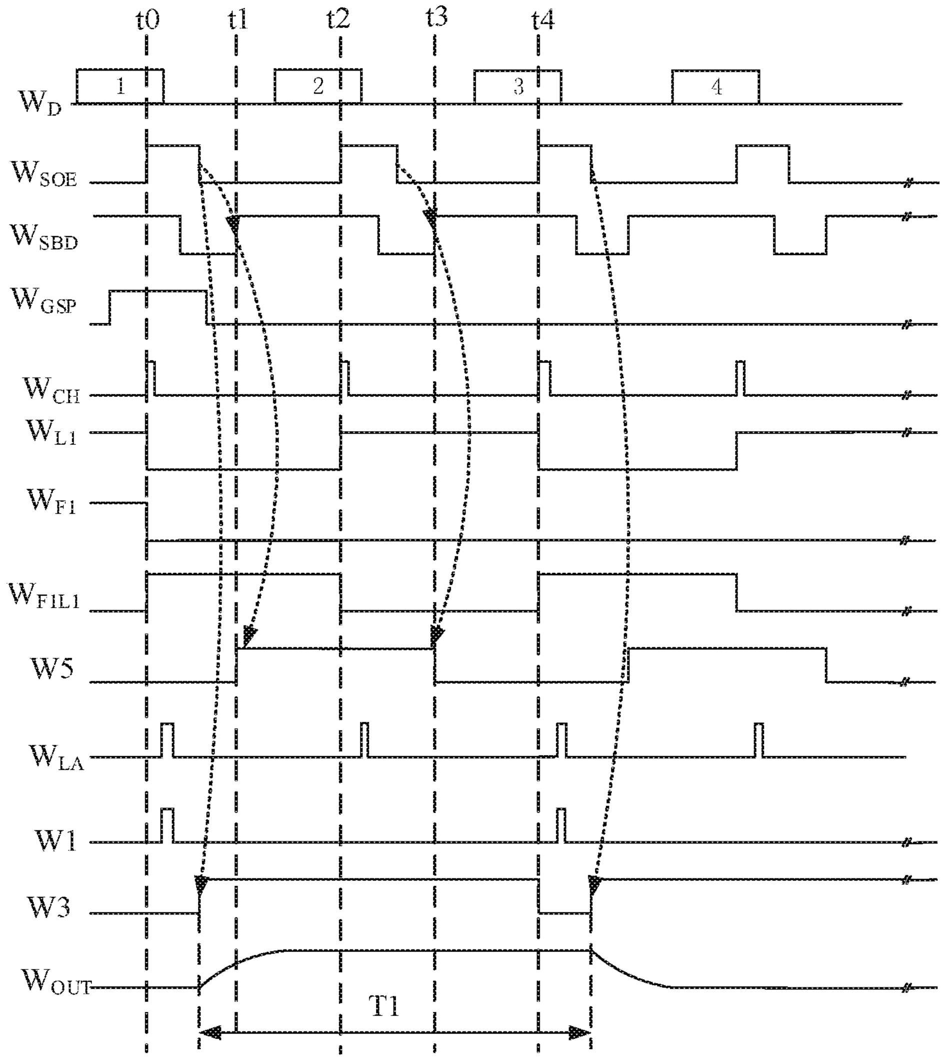
FIG. 13A is a timing diagram of other signals in an odd-numbered frame, in accordance with some embodiments.

For example, in the odd-numbered frame, timings of the source output enable signal $W_{SOE}$, the gate start signal $W_{GSP}$, the pulse signal $W_{CH}$, the initial latch enable signal $W_{LA}$, the inverted and delayed signal $W_{SBD}$ of the source output enable signal $W_{SOE}$, the first row representation signal $W_{L1}$, the first frame representation signal $W_{F1}$, a signal $W_{F1L1}$ output by the multiplier 1121, the first mask signal W5, the first latch signal W1, the first enable signal W3 and the odd-numbered row of data $W_{D1}$ are shown in FIG. 13A.

A working process of the logic and control sub-circuit 10 as shown in FIG. 8 in the odd-numbered frame is briefly described by taking FIG. 13A as an example. For example, the first mode switching signal $W_{OD1}$ may remain at a high level in both the odd-numbered frame and the even-numbered frame all the time. A rising edge of the first latch signal W1 serves to control the latch sub-circuit 20 to latch the data, and a rising edge of the first enable signal W3 serves to control the output sub-circuit 30 to output the data.

At time t0:

the pulse signal $W_{CH}$ changes from a low level to a high level, the high level of the pulse signal $W_{CH}$ and a high level of the gate start signal $W_{GSP}$ are converted to a low level by the NAND gate 1111, and then converted to a high level by the first NOT gate 1112, so that the enable terminal of the first flip-flop 1113 is valid (that is, the enable terminal of the first flip-flop 1113 is triggered by a rising edge of a signal transmitted thereto).

The input terminal of the first flip-flop 1113 is connected to the first output terminal of the first flip-flop 1113, so that in this case, a level (i.e., a high level) output from the second output terminal of the first flip-flop 1113 is the same as a level of the first output terminal of the first flip-flop 1113 before time t0. The level output from the first output terminal of the first flip-flop 1113 is converted from an original high level to a low level at time t0.

The first output terminal of the first flip-flop 1113 outputs the first frame representation signal $W_{F1}$, a low level of the first frame representation signal $W_{F1}$ represents a first frame (i.e., an odd-numbered frame). The second output terminal of the first flip-flop 1113 outputs the second frame representation signal $W_{F1B}$, a high level of the second frame representation signal $W_{F1B}$ also represents the first frame (i.e., the odd-numbered frame).

The pulse signal $W_{CH}$ changes from the low level to the high level, so that the enable terminal of the second flip-flop 1115 is valid (that is, the enable terminal of the second flip-flop 1115 is triggered by a rising edge of a signal transmitted thereto).

The input terminal of the second flip-flop 1115 is connected to the first output terminal of the second flip-flop 1115, so that in this case, a level (i.e., a high level) output from the second output terminal of the second flip-flop 1115 is the same as a level of the first output terminal of the second flip-flop 1115 before time t0. The level output from the first output terminal of the second flip-flop 1115 is converted from an original high level to a low level at time t0.

The first output terminal of the second flip-flop 1115 outputs the first row representation signal $W_{L1}$, and the low level of the first row representation signal $W_{L1}$ represents a first row (i.e., an odd-numbered row). The second output terminal of the second flip-flop 1115 outputs the second row representation signal $W_{L1B}$, and a high level of the second row representation signal $W_{L1B}$ represents the first row (i.e., the odd-numbered row).

The multiplier 1121 receives the first row representation signal $W_{L1}$, the second row representation signal $W_{L1B}$, the first frame representation signal $W_{F1}$ and the second frame representation signal $W_{F1B}$, and outputs a high level. That is, a level of $W_{F1L1}$ changes to the high level at time t0.

The enable terminal of the third flip-flop 1122 is valid at a rising edge of a signal transmitted thereto. However, the inverted and delayed signal $W_{SBD}$ of the source output enable signal $W_{SOE}$ is at a high level at time t0, and there is no change from a low level to the high level. Therefore, the enable terminal of the third flip-flop 1122 is invalid, and the output terminal of the third flip-flop 1122 still outputs a low level. That is, the first mask signal W5 output from the output terminal of the third flip-flop 1122 is at the low level.

In this way, before a rising edge of the inverted and delayed signal $W_{SBD}$ of the source output enable signal $W_{SOE}$ arrives, a waveform of the first latch signal W1 obtained after the first mask signal W5 passes through the second NOT gate 121 and the initial latch enable signal $W_{LA}$ passes through the second AND gate 122 is the same as a waveform of the initial latch enable signal Wu. Therefore, when the first row of data arrives, the rising edge of the first latch signal W1 may control the latch sub-circuit 20 to latch the first row of data.

Similarly, before the rising edge of the inverted and delayed signal $W_{SBD}$ of the source output enable signal $W_{SOE}$ arrives, the first mask signal W5 is at the low level, so that the enable terminal of the signal generator 131 is invalid. The first enable signal W3 remains inverted with the source output enable signal $W_{SOE}$. Therefore, the first enable signal W3 can control the output sub-circuit 30 to output data of the third row.

At time t1:

the inverted and delayed signal $W_{SBD}$ of the source output enable signal $W_{SOE}$ is converted from a low level to a high level, so that the enable terminal of the third flip-flop 1122 is valid. The output terminal of the third flip-flop 1122 outputs a high level. That is, the first mask signal W5 is converted from the low level to the high level.

In this way, before a next rising edge of the inverted and delayed signal $W_{SBD}$ of the source output enable signal $W_{SOE}$ arrives, the first mask signal W5 remains at the high level all the time. The first latch signal W1 obtained after the first mask signal W5 passes through the second NOT gate 121 and the initial latch enable signal Wu passes through the second AND gate 122 remains at a low level all the time. Therefore, after a second row of data arrives, the latch sub-circuit 20 no longer latches the second row of data.

Similarly, before the next rising edge of the inverted and delayed signal $W_{SBD}$ of the source output enable signal $W_{SOE}$ arrives, the first mask signal W5 remains at a high level, so that the enable terminal of the signal generator 131 is valid. The first enable signal W3 no longer changes with a change of the source output enable signal $W_{SOE}$. As a result, the source driving circuit 100 outputs the odd-numbered row of data all the time.

At time t2:

the pulse signal $W_{CH}$ changes from the low level to the high level again, and the gate start signal $W_{GSP}$ is at the low level all the time. Therefore, after the pulse signal $W_{CH}$ and the gate start signal $W_{GSP}$ pass through the NAND gate 1111 and the first NOT gate 1112, the first NOT gate 1112 outputs a low level, and there is no rising edge being triggered, so that the enable terminal of the first flip-flop 1113 is invalid.

The first output terminal of the first flip-flop 1113 keeps outputting the low level, and the second output terminal of the first flip-flop 1113 keeps outputting the high level, so that the levels output from the two output terminals still represent the first frame (i.e., the odd-numbered frame).

The pulse signal $W_{CH}$ changes from the low level to the high level again, so that the enable terminal of the second flip-flop 1115 is valid again (that is, the enable terminal of the second flip-flop 1115 is triggered by the rising edge of the signal transmitted thereto).

The input terminal of the second flip-flop 1115 is connected to the first output terminal of the second flip-flop 1115, so that in this case, the level (i.e., a low level) output from the second output terminal of the second flip-flop 1115 is the same as the level of the first output terminal of the second flip-flop 1115 before time t2. The level output from the first output terminal of the second flip-flop 1115 is converted from an original low level to a high level at time t2.

The first output terminal of the second flip-flop 1115 outputs the first row representation signal Wu, and the high level of the first row representation signal $W_{L1}$ represents a second row (i.e., an even-numbered row). The second output terminal of the second flip-flop 1115 outputs the second row representation signal $W_{L1B}$, and a low level of the second row representation signal $W_{L1B}$ represents the second row (i.e., the even-numbered row).

The multiplier 1121 receives the first row representation signal Wu, the second row representation signal $W_{L1B}$, the first frame representation signal $W_{F1}$ and the second frame representation signal $W_{F1B}$, and outputs a low level. That is, the level of $W_{F1L1}$ changes to the low level at time t2.

The enable terminal of the third flip-flop 1122 is valid at the rising edge of the signal transmitted thereto. However, the inverted and delayed signal $W_{SBD}$ of the source output enable signal $W_{SOE}$ is at the high level at time t2. Therefore, the output terminal of the third flip-flop 1122 still outputs the high level. That is, the first mask signal W5 output from the output terminal of the third flip-flop 1122 is at the high level.

In this way, before the rising edge of the inverted and delayed signal $W_{SBD}$ of the source output enable signal $W_{SOE}$ arrives, the first latch signal W1 obtained after the first mask signal W5 passes through the second NOT gate 121 and the initial latch enable signal $W_{LA}$ passes through the second AND gate 122 remains at the low level all the time. Therefore, after the second row of data arrives, there is no rising edge in the first latch signal W1, so that the latch sub-circuit 20 no longer latches the second row of data.

Similarly, before the rising edge of the inverted and delayed signal $W_{SBD}$ of the source output enable signal $W_{SOE}$ arrives, the first mask signal is at the high level, so that the enable terminal of the signal generator 131 is valid. The first enable signal W3 no longer changes with the change of the source output enable signal $W_{SOE}$. Therefore, the source driving circuit 100 outputs the odd-numbered row of data all the time.

At time t3:

the inverted and delayed signal $W_{SED}$ of the source output enable signal $W_{SOE}$ changes from the low level to the high level again, so that the enable terminal of the third flip-flop 1122 is valid. The output terminal of the third flip-flop 1122 outputs a low level. That is, the first mask signal W5 is converted from the high level to the low level.

In this way, the waveform of the first latch signal W1 obtained after the first mask signal W5 passes through the second NOT gate 121 and the initial latch enable signal $W_{LA}$ passes through the second AND gate 122 is the same as the waveform of the initial latch enable signal $W_{LA}$ again. Therefore, when a third row of data arrives, the rising edge of the first latch signal W1 may control the latch sub-circuit 20 to latch the third row of data.

Similarly, the first mask signal W5 is at the low level, so that the enable terminal of the signal generator 131 is invalid. The first enable signal W3 remains inverted with the source output enable signal $W_{SOE}$. Therefore, the first enable signal W3 can control the output sub-circuit 30 to output the third row of data.

At time t4:

the pulse signal $W_{CH}$ changes from the low level to the high level, same as time t2, the first output terminal of the first flip-flop 1113 keeps outputting the low level. As a result, the low level output from the first output terminal of the first flip-flop 1113 still represents the first frame (i.e., the odd-numbered frame).

However, the enable terminal of the second flip-flop 1115 is valid again (that is, the enable terminal of the second flip-flop 1115 is triggered by the rising edge of the signal transmitted thereto). The input terminal of the second flip-flop 1115 is connected to the first output terminal of the second flip-flop 1115, so that in this case, the level (i.e., the high level) output from the second output terminal of the second flip-flop 1115 is the same as the level of the first output terminal of the second flip-flop 1115 before time t4. The level output from the first output terminal of the second flip-flop 1115 is converted from an original high level to a low level at time t4.

The first output terminal of the second flip-flop 1115 outputs the first row representation signal $W_{L1}$, and the low level of the first row representation signal $W_{L1}$ represents a third row (i.e., an odd-numbered row). The second output terminal of the second flip-flop 1115 outputs the second row representation signal $W_{L1B}$, and a high level of the second row representation signal $W_{L1B}$ represents the third row (i.e., the odd-numbered row).

The multiplier 1121 receives the first row representation signal $W_{L1}$, the second row representation signal $W_{L1B}$, the first frame representation signal $W_{F1}$ and the second frame representation signal $W_{F1B}$, and outputs a high level. That is, the level of $W_{F1L1}$ changes to the high level at time t4.

The enable terminal of the third flip-flop 1122 is valid at the rising edge of the signal transmitted thereto. However, the inverted and delayed signal $W_{SBD}$ of the source output enable signal $W_{SOE}$ is at the high level at time t4. Therefore, the output terminal of the third flip-flop 1122 still outputs the low level. That is, the first mask signal W5 output from the output terminal of the third flip-flop 1122 is at the low level.

In this way, the waveform of the first latch signal W1 obtained after the first mask signal W5 passes through the second NOT gate 121 and the initial latch enable signal $W_{LA}$ passes through the second AND gate 122 is the same as the waveform of the initial latch enable signal WA. Therefore, when the third row of data arrives, the rising edge of the first latch signal W1 may control the latch sub-circuit 20 to latch the third row of data.

Similarly, the first mask signal W5 is at the low level, so that the enable terminal of the signal generator 131 is invalid. The first enable signal W3 remains inverted with the source output enable signal $W_{SOE}$. Therefore, the first enable signal W3 can control the output sub-circuit 30 to output the third row of data.

Referring to the working process of the source driving circuit 100 at times t0 to t4, in the odd-numbered frame, and after time t4, the low level of the first frame representation signal $W_{F1}$ is still output, and the high level of the second frame representation signal $W_{F1B}$ is still output, thereby representing the first frame (i.e., the odd-numbered frame).

The low level of the first row representation signal Wu is output under control of an odd-numbered rising edge of the pulse signal $W_{CH}$, and the high level of the second row representation signal $W_{L1B}$ is output under the control of the odd-numbered rising edge of the pulse signal $W_{CH}$, thereby representing the odd-numbered row under the control of the odd-numbered rising edge of the pulse signal $W_{CH}$.

In addition, the high level of the first row representation signal $W_{L1}$ is output under control of an even-numbered rising edge of the pulse signal $W_{CH}$, and the low level of the second row representation signal $W_{L1B}$ is output under the control of the even-numbered rising edge of the pulse signal $W_{CH}$, thereby representing the even-numbered row under the control of the even-numbered rising edge of the pulse signal $W_{CH}$.

The multiplier 1121 also outputs the signal $W_{F1L1}$ after receiving the first row representation signal $W_{L1}$, the second row representation signal $W_{L1B}$, the first frame representation signal $W_{F1}$ and the second frame representation signal $W_{F1B}$. The signal $W_{F1L1}$ changes from the low level to the high level at a time of the odd-numbered rising edge of the pulse signal $W_{CH}$. The signal $W_{F1L1}$ changes from the high level to the low level at a time of the even-numbered rising edge of the pulse signal $W_{CH}$.

A level of first mask signal W5, which is the same as the signal $W_{F1L1}$, is output under control of the inverted and delayed signal $W_{SBD}$ of the source output enable signal $W_{SOE}$, so that the first latch signal W1 controls the latch sub-circuit 20 to latch only the odd-numbered row of data in the odd-numbered frame, and the first enable signal W3 controls the output sub-circuit 30 to output only the odd-numbered row of data in the odd-numbered frame.

Figure 13B:
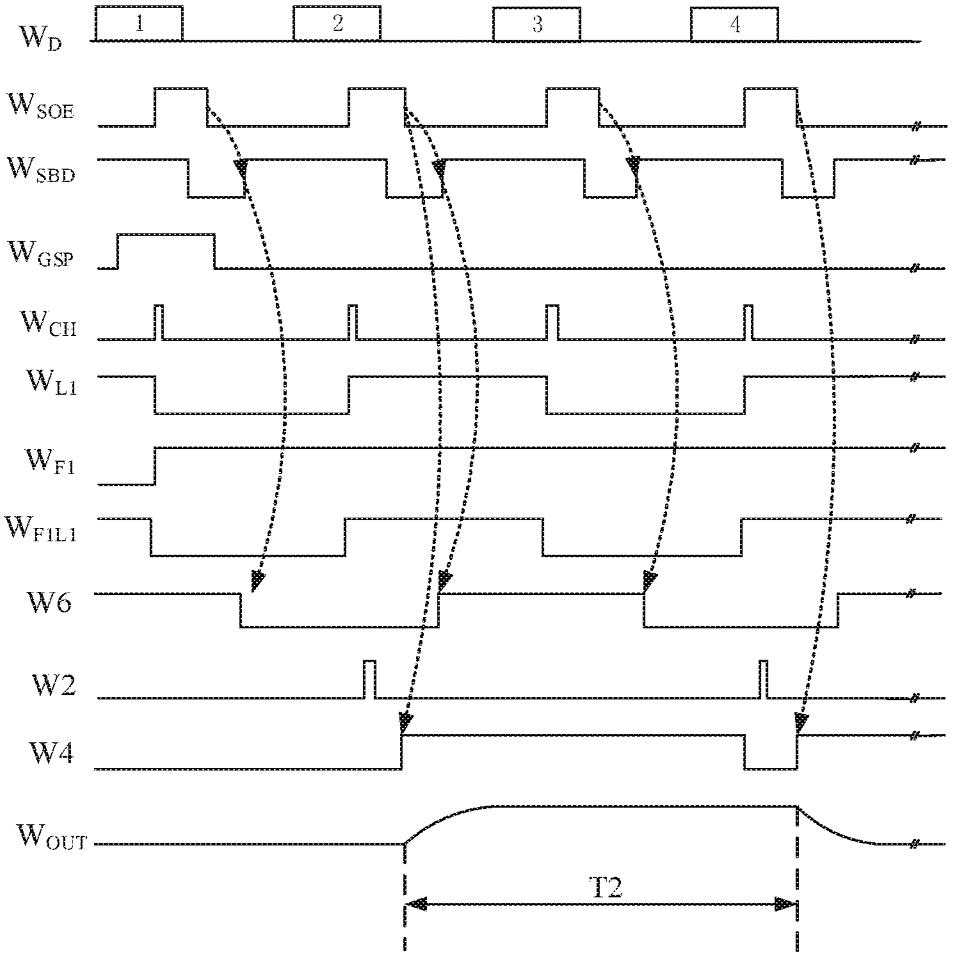
FIG. 13B is a timing diagram of other signals in an even-numbered frame, in accordance with some embodiments.

For example, in the even-numbered frame, timings of the source output enable signal $W_{SOE}$, the gate start signal $W_{GSP}$, the pulse signal $W_{CH}$, the initial latch enable signal $W_{LA}$, the inverted and delayed signal $W_{SBD}$ of the source output enable signal $W_{SOE}$, the first row representation signal $W_{L1}$, the first frame representation signal $W_{F1}$, the signal $W_{F1L1}$ output by the multiplier 1121, the second mask signal W6, the second latch signal W2, the second enable signal W4, and the even-numbered row of data $W_{D2}$ are shown in FIG. 13B.

The working process of the logic and control sub-circuit 10 as shown in FIG. 8 in the even-numbered frame will not be described here, and the working process of the logic-control sub-circuit 10 in the even-numbered frame may be understood with reference to the working process of the logic and control sub-circuit 10 in the odd-numbered frame and FIG. 13B.

It is worth noting that, in the even-numbered frame, when the pulse signal $W_{CH}$ changes from the low level to the high level for a first time (i.e., at the time of a first rising edge thereof), the gate start signal $W_{GSP}$ is at the high level again. As a result, the high level of the pulse signal $W_{CH}$ and the high level of the gate start signal $W_{GSP}$ are converted to the low level by the NAND gate 1111, and then converted to the high level by the first NOT gate 1112, so that the enable terminal of the first flip-flop 1113 is valid (that is, the enable terminal of the first flip-flop 1113 is triggered by the rising edge of the signal transmitted thereto).

The input terminal of the first flip-flop 1113 is connected to the first output terminal of the first flip-flop 1113, so that in this case, the level (i.e., the low level) output from the second output terminal of the first flip-flop 1113 is the same as the level of the first output terminal of the first flip-flop 1113 in the odd-numbered frame. The level output from the first output terminal of the first flip-flop 1113 is converted from a previous low level to the high level.

That is, the first frame representation signal $W_{F1}$ output from the first output terminal of the first flip-flop 1113 is at the high level, and represents a second frame (i.e., an even-numbered frame). The second frame representation signal $W_{F1B}$ output from the second output terminal of the first flip-flop 1113 is at the low level, and also represents the second frame (i.e., the even-numbered frame). In addition, in the second frame (i.e., the even-numbered frame), levels of the first frame representation signal $W_{F1}$ and the second frame representation signal $W_{F1B}$ no longer change.

In some embodiments, the first mode switching signal $W_{OD1}$ may remain at a high level in both the odd-numbered frame and the even-numbered frame. In some other embodiments, the first mode switching signal $W_{OD1}$ may remain at a low level in both the odd-numbered frame and the even-numbered frame.

Figure 14:
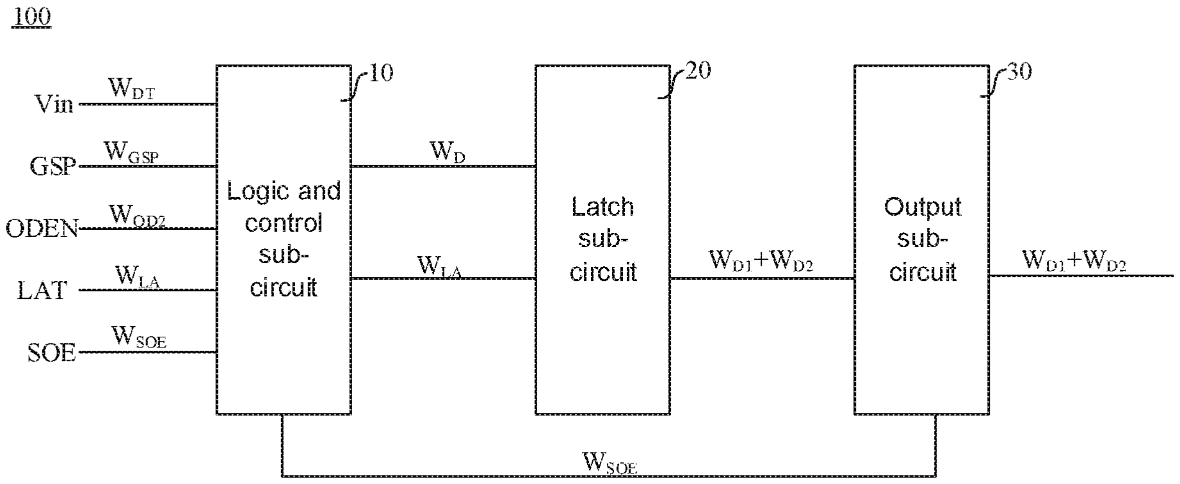
FIG. 14 is a configuration diagram of yet another source driving circuit, in accordance with some embodiments.
Figure 15:
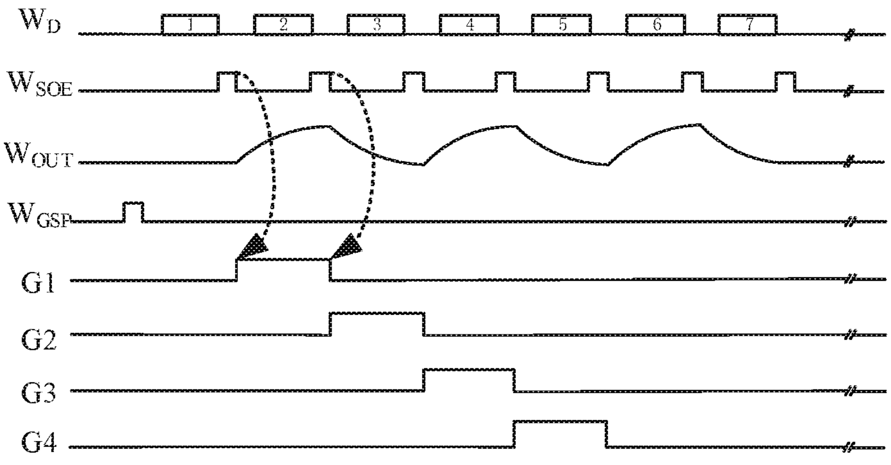
FIG. 15 is a timing diagram of signals in an odd-numbered or in an even-numbered frame, in accordance with some embodiments.

In some embodiments, referring to FIGS. 14 and 15, the logic and control sub-circuit 10 is further configured to receive and output the initial latch enable signal $W_{LA}$ and the source output enable signal $W_{SOE}$ according to the gate start signal $W_{GSP}$ and the second mode switching signal $W_{DD2}$ from the mode switching signal terminal ODEN.

The latch sub-circuit 20 is further configured to latch the odd-numbered row of data $W_{D1}$ and the even-numbered row of data $W_{D2}$ in the data signal $W_D$ in each frame under control of the initial latch enable signal $W_{LA}$.

The output sub-circuit 30 is further configured to output the odd-numbered row of data $W_{D1}$ and the even-numbered row of data $W_{D2}$ under control of the source output enable signal $W_{SOE}$. The charging time of the sub-pixels in the odd-numbered row and the charging time of the sub-pixels in the even-numbered row are equal. That is, an output time of the odd-numbered row of data $W_{D1}$ and an output time of the even-numbered row of data $W_{D2}$ are equal.

In this way, the source driving circuit 100 may have two driving modes: in a first mode, the odd-numbered row of data is output in the first set duration in the odd-numbered frame, and the even-numbered row of data is output in the second set duration in the even-numbered frame; in a second mode, the odd-numbered row of data and the even-numbered row of data are output in each frame, and the odd-numbered row of data and the even-numbered row of data have the same output time. As a result, the source driving circuit 100 has variety in the driving method.

Figure 16:
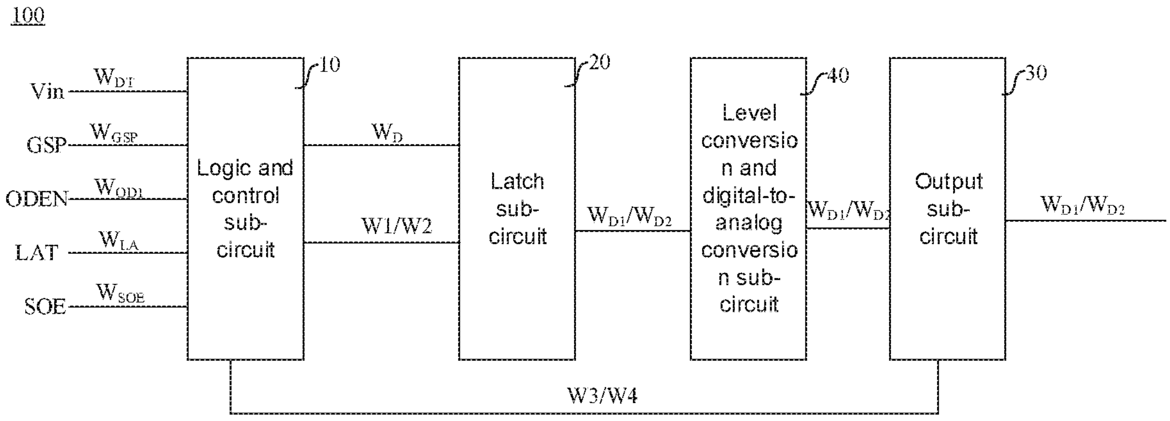
FIG. 16 is a configuration diagram of yet another source driving circuit, in accordance with some embodiments.

In some embodiments, as shown in FIG. 16, the source driving circuit 100 further includes a level conversion and digital-to-analog conversion sub-circuit 40.

The level conversion and digital-to-analog conversion sub-circuit 40 is coupled to the latch sub-circuit 20 and the output sub-circuit 30. The level conversion and digital-to-analog conversion sub-circuit 40 is configured to: receive the odd-numbered row of data $W_{D1}$ in the odd-numbered frame, and perform level conversion and digital-to-analog conversion on the odd-numbered row of data $W_{D1}$; receive the even-numbered row of data $W_{D2}$ in the even-numbered frame, and perform the level conversion and digital-to-analog conversion on the even-numbered row of data $W_{D2}$. A circuit configuration of the level conversion and digital-to-analog conversion sub-circuit 40 is not specifically limited in the embodiments of the present disclosure.

For example, level conversion may amplify the odd-numbered row of data and the even-numbered row of data.

Figure 17:
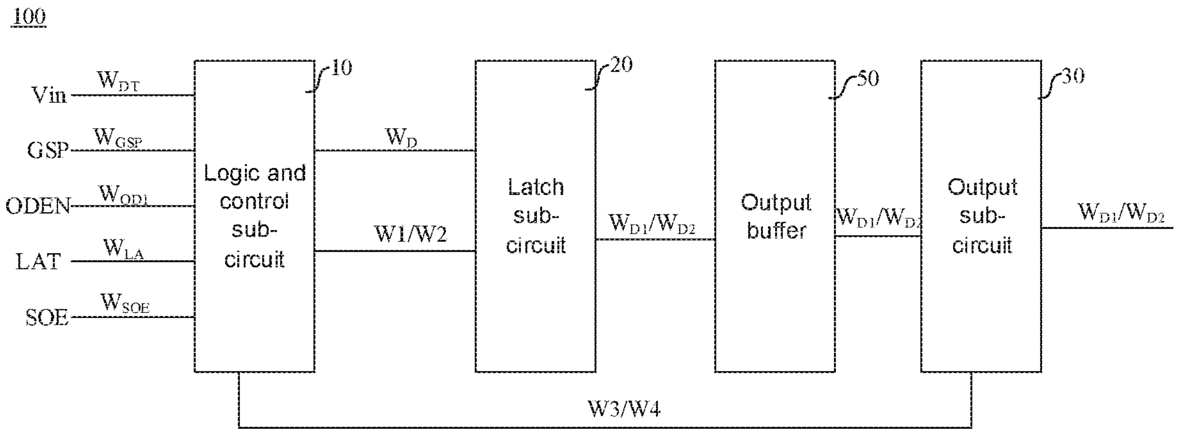
FIG. 17 is a configuration diagram of yet another source driving circuit, in accordance with some embodiments.

In some embodiments, as shown in FIG. 17, the source driving circuit 100 further includes an output buffer 50. The output buffer 50 is coupled to the latch sub-circuit 20 and the output sub-circuit 30. The output buffer 50 is configured to: receive the odd-numbered row of data $W_{D1}$ in the odd-numbered frame, and temporarily store the odd-numbered row of data $W_{D1}$; and receive the even-numbered row of data $W_{D2}$ in the even-numbered frame, and temporarily store the even-numbered row of data $W_{D2}$.

A circuit configuration of the output buffer 50 is not specifically limited in the embodiments of the present disclosure.

Figure 18:
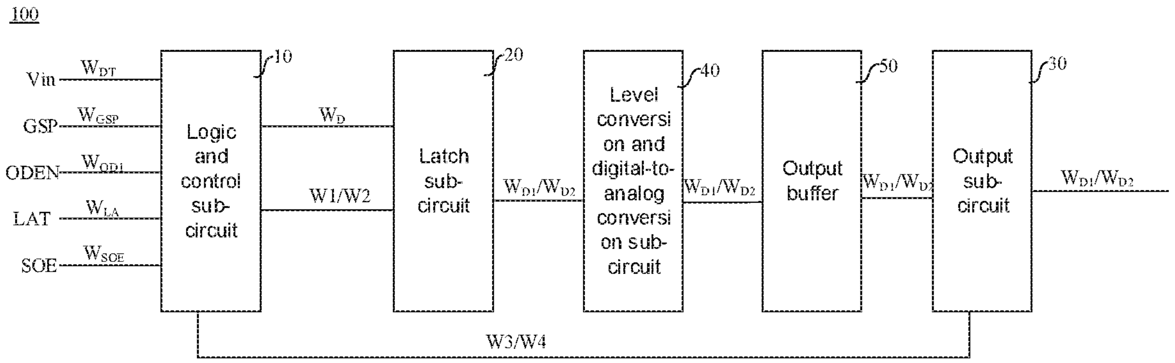
FIG. 18 is a configuration diagram of yet another source driving circuit, in accordance with some embodiments.

In some embodiments, as shown in FIG. 18, the source driving circuit 100 may include the level conversion and digital-to-analog conversion sub-circuit 40 and the output buffer 50. In this case, the level conversion and digital-to-analog conversion sub-circuit 40 is coupled to the latch sub-circuit 20 and the output buffer 50, and the output buffer 50 is coupled to the output sub-circuit 30.

Figure 19:
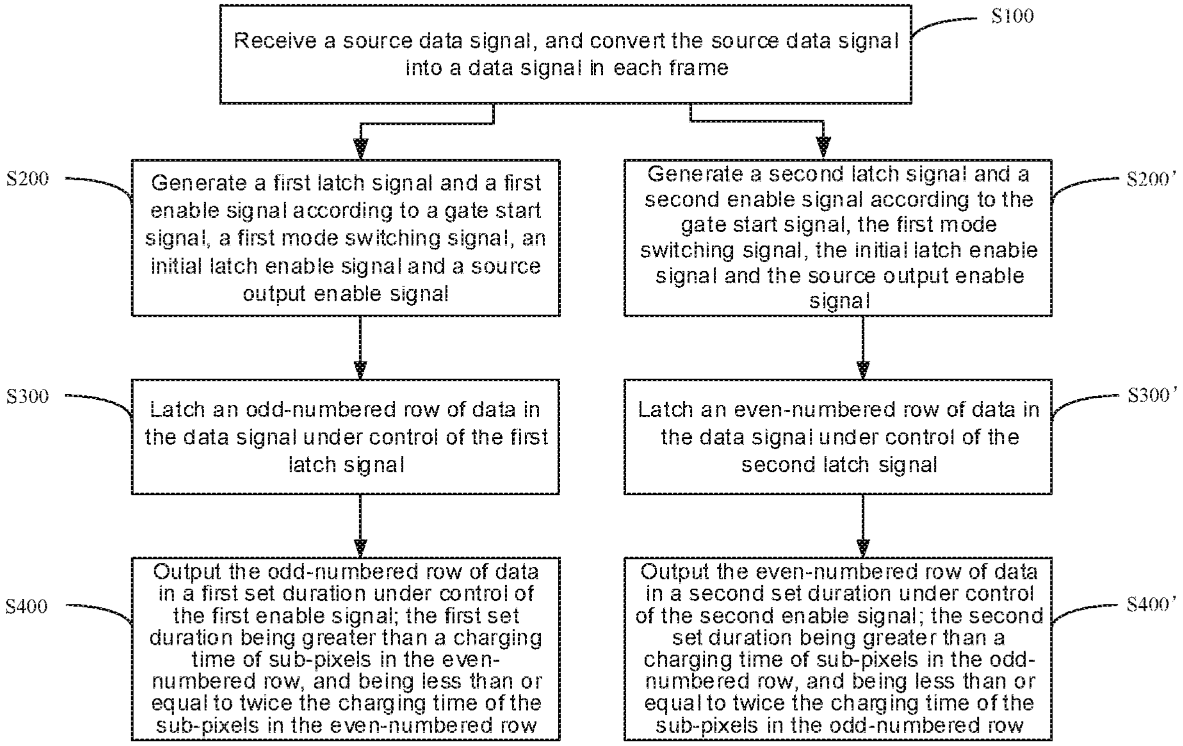
FIGS. 19 to 23 are flowcharts of a source driving method, in accordance with some embodiments.

As shown in FIG. 19, in some embodiments of the present disclosure, a source driving method is provided. The source driving method includes:

S100, receiving a source data signal $W_{DT}$, and converting the source data signal $W_{DT}$ into a data signal $W_D$ in each frame;

in an odd-numbered frame:

S200, generating a first latch signal W1 and a first enable signal W3 according to a gate start signal $W_{GSP}$, a first mode switching signal $W_{OD1}$, an initial latch enable signal $W_{LA}$ and a source output enable signal $W_{SOE}$;

S300, latching an odd-numbered row of data $W_{D1}$ in the data signal $W_D$ under control of the first latch signal W1; and

S400, outputting the odd-numbered row of data in a first set duration T1 under control of the first enable signal W1; the first set duration T1 being greater than a charging time of sub-pixels in the even-numbered row, and being less than or equal to twice the charging time of the sub-pixels in the even-numbered row;

in an even-numbered frame:

S200', generating a second latch signal W2 and a second enable signal W4 according to the gate start signal $W_{GSP}$, the first mode switching signal $W_{OD1}$, the initial latch enable signal WA and the source output enable signal $W_{SOE}$;

S300', latching an even-numbered row of data $W_{D2}$ in the data signal $W_D$ under control of the second latch signal W2; and

S400', outputting the even-numbered row of data $W_{D2}$ in a second set duration T2 under control of the second enable signal W2; the second set duration T2 being greater than a charging time of sub-pixels in the odd-numbered row, and being less than or equal to twice the charging time of the sub-pixels in the odd-numbered row.

Beneficial effects that can be achieved by the source driving method provided in the embodiments of the present disclosure are the same as the beneficial effects that can be achieved by the source driving circuit, and details will not be repeated here.

In some embodiments, the first set duration T1 is twice the charging time of the sub-pixels in the even-numbered row in the odd-numbered frame.

In some other embodiments, the second set duration T2 is twice the charging time of the sub-pixels in the odd-numbered row in the even-numbered frame.

In yet some other embodiments, the first set duration T1 is twice the charging time of the sub-pixels in the even-numbered row in the odd-numbered frame, and the second set duration T2 is twice the charging time of the sub-pixels in the odd-numbered row in the even-numbered frame.

Figure 20:
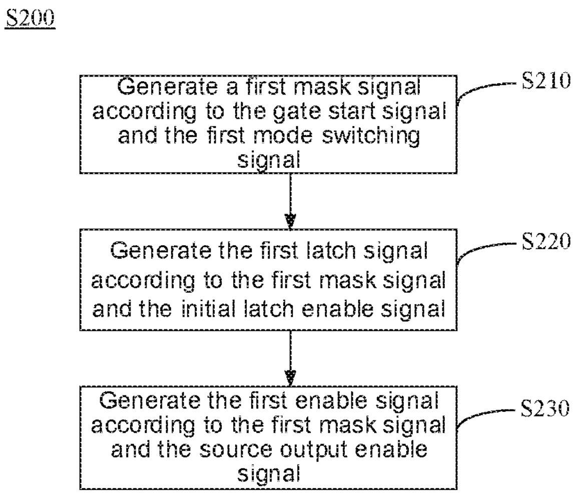

In some embodiments, as shown in FIG. 20, S200, generating the first latch signal W1 and the first enable signal W3 according to the gate start signal $W_{GSP}$, the first mode switching signal $W_{OD1}$, the initial latch enable signal WA and the source output enable signal $W_{SOE}$, includes the following steps.

In S210, a first mask signal W5 is generated according to the gate start signal $W_{GSP}$ and the first mode switching signal $W_{OD1}$.

Figure 21:
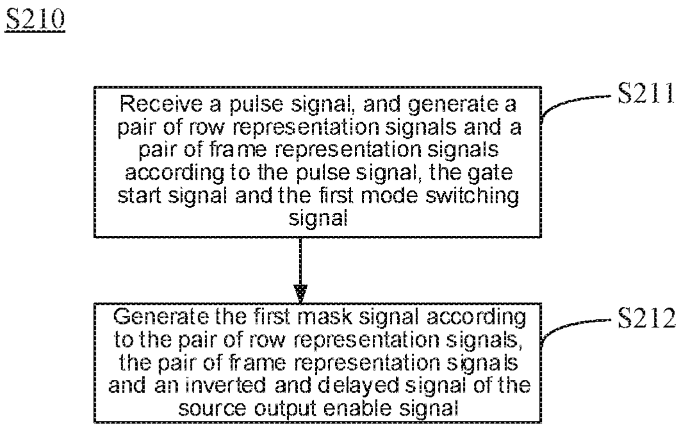

For example, as shown in FIG. 21, S210, generating the first mask signal W5 according to the gate start signal $W_{GSP}$ and the first mode switching signal $W_{OD1}$, includes:

S211, receiving a pulse signal $W_{CH}$, and generating a pair of row representation signals ($W_{L1}$, $W_{L1B}$) and a pair of frame representation signals ($W_{F1}$, $W_{F1B}$) according to the pulse signal $W_{CH}$, the gate start signal $W_{GSP}$ and the first mode switching signal $W_{OD1}$; the pair of row representation signals ($W_{L1}$, $W_{L1B}$) including a first row representation signal $W_{L1}$ and a second row representation signal $W_{L1B}$ that are mutually inverted, and the pair of frame representation signals ($W_{F1}$, $W_{F1B}$) including a first frame representation signal $W_{F1}$ and a second frame representation signal $W_{F1B}$ that are mutually inverted; and

S212, generating the first mask signal W5 according to the pair of row representation signals ($W_{L1}$, $W_{L1B}$), the pair of frame representation signals ($W_{F1}$, $W_{F1B}$) and an inverted and delayed signal $W_{SBD}$ of the source output enable signal $W_{SOE}$.

The first row representation signal $W_{L1}$ is at a low level in a time of the odd-numbered row and at a high level in a time of the even-numbered row; the first frame representation signal $W_{F1}$ is at a low level in a time of the odd-numbered frame and at a high level in a time of the even-numbered frame.

Alternatively, the first row representation signal $W_{L1}$ is at the high level in the time of the odd-numbered row and at the low level in the time of the even-numbered row; the first frame representation signal $W_{F1}$ is at the high level in the time of the odd-numbered frame and at the low level in the time of the even-numbered frame.

In S220, the first latch signal W1 is generated according to the first mask signal W5 and the initial latch enable signal WA.

In S230, the first enable signal W3 is generated according to the first mask signal W5 and the source output enable signal $W_{SOE}$.

Figure 22:
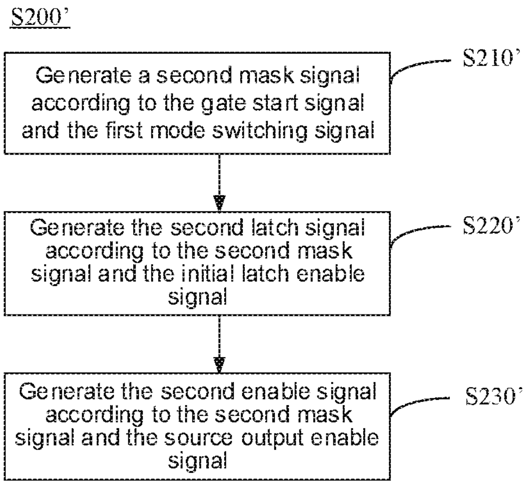

In some embodiments, as shown in FIG. 22, S200', generating the second latch signal W2 and the second enable signal W4 according to the gate start signal $W_{GSP}$, the first mode switching signal $W_{OD1}$, the initial latch enable signal WA and the source output enable signal $W_{SOE}$, includes the following steps.

In S210', a second mask signal W6 is generated according to the gate start signal $W_{GSP}$ and the first mode switching signal $W_{OD1}$.

Figure 23:
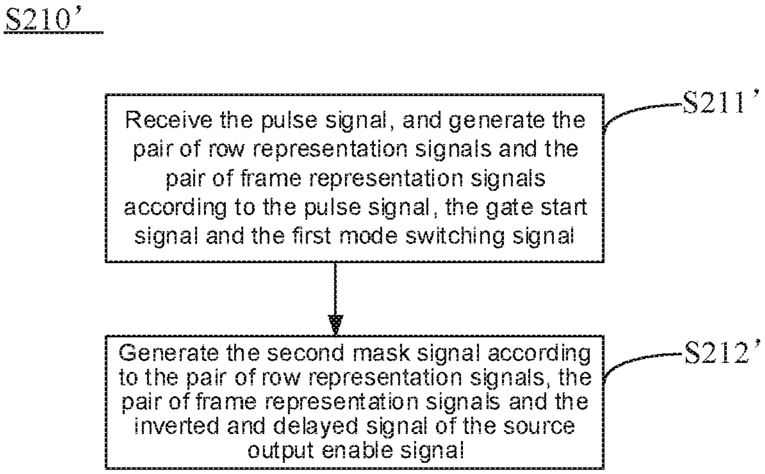

For example, as shown in FIG. 23, S210', generating the second mask signal W6 according to the gate start signal $W_{GSP}$ and the first mode switching signal $W_{OD1}$, includes:

S211', receiving the pulse signal $W_{CH}$, and generating the pair of row representation signals ($W_{L1}$, $W_{L1B}$) and the pair of frame representation signals ($W_{F1}$, $W_{F1B}$) according to the pulse signal $W_{CH}$, the gate start signal $W_{GSP}$ and the first mode switching signal $W_{OD1}$; the pair of row representation signals ($W_{L1}$, $W_{L1B}$) including the first row representation signal Wu and the second row representation signal $W_{L1B}$ that are mutually inverted, and the pair of frame representation signals ($W_{F1}$, $W_{F1B}$) including the first frame representation signal $W_{F1}$ and the second frame representation signal $W_{F1B}$ that are mutually inverted; and S212', generating the second mask signal W6 according to the pair of row representation signals ($W_{L1}$, $W_{L1B}$), the pair of frame representation signals ($W_{F1}$, $W_{F1B}$) and the inverted and delayed signal $W_{SBD}$ of the source output enable signal $W_{SOE}$.

The first row representation signal Wu is at the low level in the time of the odd-numbered row and at the high level in the time of the even-numbered row; the first frame representation signal $W_{F1}$ is at the low level in the time of the odd-numbered frame and at the high level in the time of the even-numbered frame. Alternatively, the first row representation signal $W_{L1}$ is at the high level in the time of the odd-numbered row and at the low level in the time of the even-numbered row; the first frame representation signal $W_{F1}$ is at the high level in the time of the odd-numbered frame and at the low level in the time of the even-numbered frame.

In S220', the second latch signal W2 is generated according to the second mask signal W6 and the initial latch enable signal $W_{LA}$.

In S230', the second enable signal W4 is generated according to the second mask signal W6 and the source output enable signal $W_{SOE}$.

Figure 24:
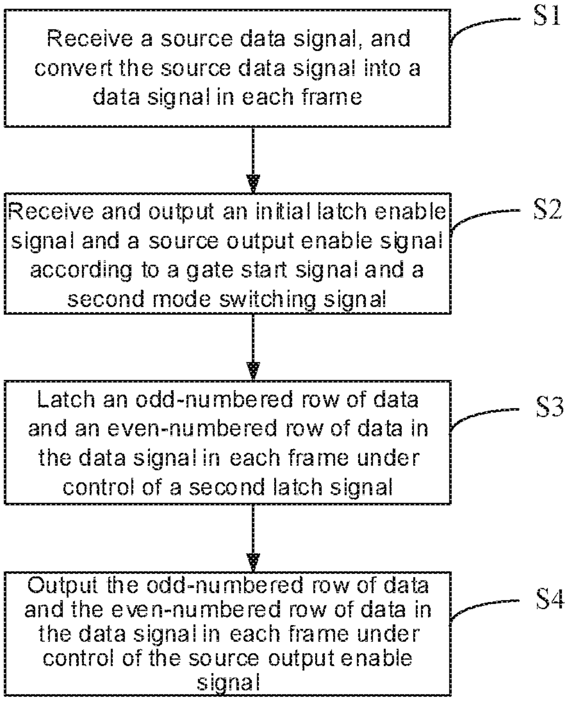
FIG. 24 is a flowchart of another source driving method, in accordance with some embodiments.

As shown in FIG. 24, in some embodiments of the present disclosure, another source driving method is also provided. The source driving method includes:

- S1, receiving a source data signal $W_{DT}$, and converting the source data signal $W_{DT}$ into a data signal $W_D$ in each frame;
- S2, receiving and outputting an initial latch enable signal $W_{LA}$ and a source output enable signal $W_{SOE}$ according to a gate start signal $W_{GSP}$ and a second mode switching signal $W_{OD2}$;
- S3, latching an odd-numbered row of data $W_{D1}$ and an even-numbered row of data $W_{D2}$ in the data signal $W_D$ in each frame under control of a second latch signal $W_{LA}$; and
- S4, outputting the odd-numbered row of data $W_{D1}$ and the even-numbered row of data $W_{D2}$ in the data signal $W_D$ in each frame under control of the source output enable signal $W_{SOE}$; sub-pixels in the odd-numbered row and sub-pixels in the even-numbered row have a same charging time.

Figure 25:
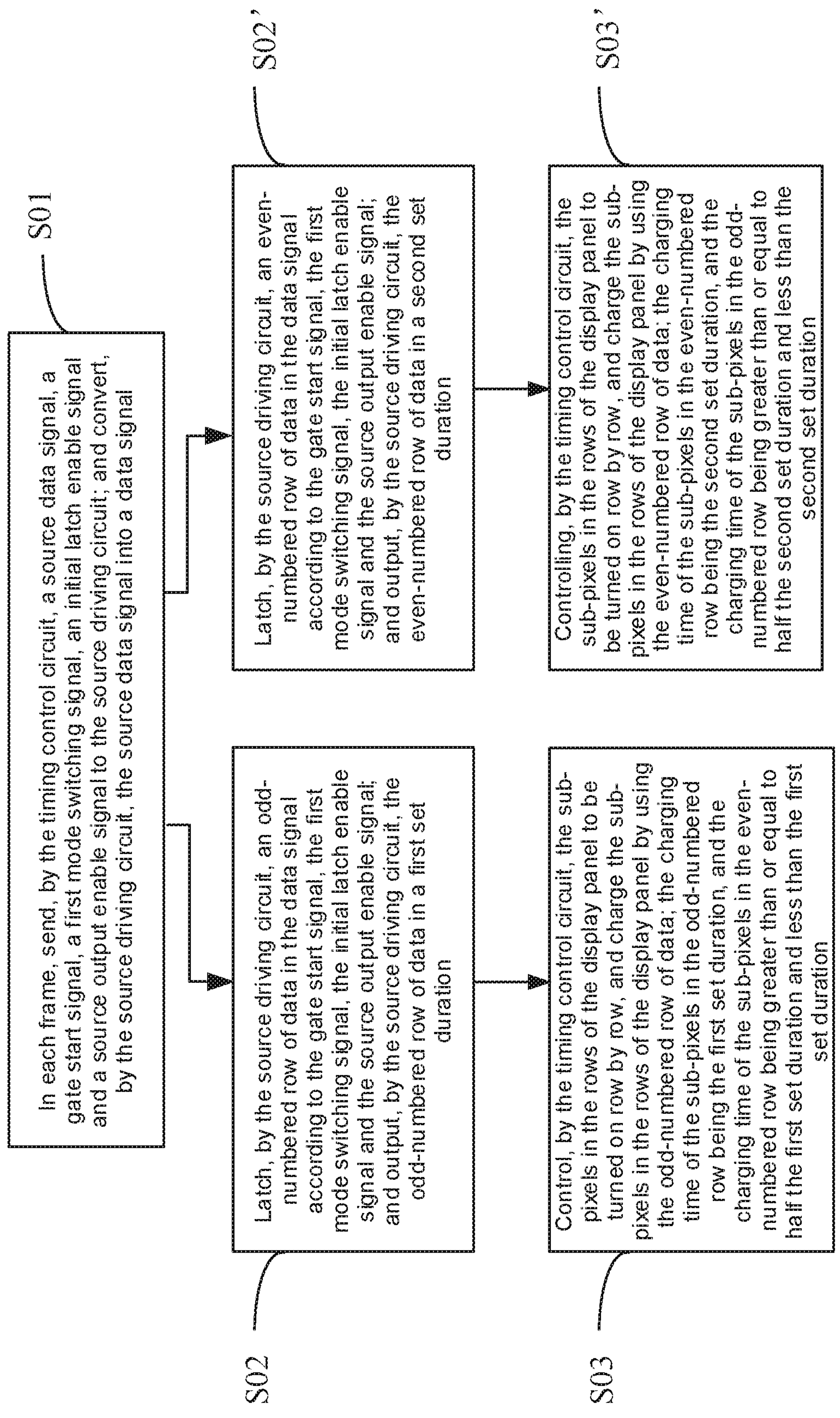
FIG. 25 is a flowchart of a display driving method, in accordance with some embodiments.

Some embodiments of the present disclosure provide a display driving method, which is applied to the display device 1000 described in any one of the embodiments. As shown in FIGS. 2 and 25, the display driving method includes:

- S01, in each frame, sending, by the timing control circuit 200, a source data signal $W_{DT}$, a gate start signal $W_{GSP}$, a first mode switching signal $W_{OD1}$, an initial latch enable signal $W_{LA}$ and a source output enable signal $W_{SOE}$ to the source driving circuit 100; and converting, by the source driving circuit 100, the source data signal $W_{DT}$ into a data signal $W_D$;

in an odd-numbered frame:

- S02, latching, by the source driving circuit 100, an odd-numbered row of data $W_{D1}$ in the data signal $W_D$ according to the gate start signal $W_{GSP}$, the first mode switching signal $W_{D1}$, the initial latch enable signal Wu and the source output enable signal $W_{SOE}$; and outputting, by the source driving circuit 100, the odd-numbered row of data $W_{D1}$ in a first set duration T1; and
- S03, controlling, by the timing control circuit 200, sub-pixels 310 in rows of the display panel 300 to be turned on row by row, and charging the sub-pixels 310 in the rows of the display panel 300 by using the odd-numbered row of data $W_{D1}$; a charging time of sub-pixels in the odd-numbered row being the first set duration T1, and a charging time of sub-pixels in an even-numbered row being greater than or equal to half the first set duration T1 and less than the first set duration T1;

in an even-numbered frame:

- S02', latching, by the source driving circuit 100, an even-numbered row of data $W_{D2}$ in the data signal $W_D$ according to the gate start signal $W_{GSP}$, the first mode switching signal $W_{OD1}$, the initial latch enable signal Wu and the source output enable signal $W_{SOE}$; and outputting, by the source driving circuit 100, the even-numbered row of data $W_{D2}$ in a second set duration T2; and
- S03', controlling, by the timing control circuit 200, the sub-pixels 310 in the rows of the display panel 300 to be turned on row by row, and charging the sub-pixels 310 in the rows of the display panel 300 by using the even-numbered row of data $W_{D2}$; the charging time of the sub-pixels in the even-numbered row being the second set duration T2, and the charging time of the sub-pixels in the odd-numbered row being greater than or equal to half the second set duration T2 and less than the second set duration T2.

Beneficial effects that can be achieved by the display driving method provided in the embodiments of the present disclosure are the same as the beneficial effects that can be achieved by the source driving circuit, and details will not repeated here.

In some embodiments, the charging time of the sub-pixels in the even-numbered row is equal to half the first set duration T1 in the odd-numbered frame.

In some other embodiments, the charging time of the sub-pixels in the odd-numbered row is equal to half the second set duration T2 in the even-numbered frame.

In yet some other embodiments, the charging time of the sub-pixels in the even-numbered row is equal to half the first set duration T1 in the odd-numbered frame, and the charging time of the sub-pixels in the odd-numbered row is equal to half the second set duration T2 in the even-numbered frame.

In some examples, as shown in FIGS. 4A and 4B, in the odd-numbered frame, for sub-pixels 310 in two adjacent rows, when a charging time of sub-pixels 310 in an odd-numbered row in the two adjacent rows reaches half the first set duration T1, sub-pixels 310 in an even-numbered row in the two adjacent rows of are turned on for charging. In the even-numbered frame, for the sub-pixels 310 in the two adjacent rows, when a charging time of the sub-pixels 310 in the even-numbered row in the two adjacent rows reaches half of the second set duration T2, the sub-pixels 310 in the odd-numbered row are turned on for charging.

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A source driving circuit, comprising:

a logic and control sub-circuit coupled to a source data signal terminal, a gate start signal terminal, a mode switching signal terminal, an initial latch enable signal terminal and a source output enable signal terminal, the logic and control sub-circuit being configured to: receive a source data signal from the source data signal terminal and convert the source data signal into a data signal; and output a first latch signal, a second latch signal, a first enable signal and a second enable signal according to a gate start signal from the gate start signal terminal, a first mode switching signal from the mode switching signal terminal, an initial latch enable signal from the initial latch enable signal terminal and a source output enable signal from the source output enable signal terminal;

a latch sub-circuit coupled to the logic and control sub-circuit, the latch sub-circuit being configured to:

receive the data signal from the logic and control sub-circuit; latch an odd-numbered row of data in the data signal in an odd-numbered frame under control of the first latch signal; and latch an even-numbered row of data in the data signal in an even-numbered frame under control of the second latch signal; and an output sub-circuit coupled to the latch sub-circuit and the logic and control sub-circuit, the output sub-circuit being configured to: receive the odd-numbered row of data in the odd-numbered frame, and output the odd-numbered row of data in a first set duration under control of the first enable signal, the first set duration being greater than a charging time of sub-pixels in the even-numbered row of a display device to which the source driving circuit applies, and being less than or equal to twice the charging time of the sub-pixels in the even-numbered row; and receive the even-numbered row of data in the even-numbered frame, and output the even-numbered row of data in a second set duration under control of the second enable signal, the second set duration being greater than a charging time of sub-pixels in the odd-numbered row of the display device, and being less than or equal to twice the charging time of the sub-pixels in the odd-numbered row.

2. The source driving circuit according to claim 1, wherein in the odd-numbered frame, the first set duration is twice the charging time of the sub-pixels in the even-numbered row; and/or, in the even-numbered frame, the second set duration is equal to twice the charging time of the sub-pixels in the odd-numbered row.

3. The source driving circuit according to claim 1, wherein the logic and control sub-circuit includes:

a mask signal generation module coupled to the gate start signal terminal and the mode switching signal terminal, the mask signal generation module being configured to generate a first mask signal and a second mask signal according to the gate start signal and the first mode switching signal;

a latch signal generation module coupled to the mask signal generation module and the initial latch enable signal terminal, the latch signal generation module being configured to, generate the first latch signal according to the first mask signal and the initial latch enable signal, and generate the second latch signal according to the second mask signal and the initial latch enable signal; and an enable signal generation module coupled to the mask signal generation module and the source output enable signal terminal, the enable signal generation module being configured to, generate the first enable signal according to the first mask signal and the source output enable signal, and generate the second enable signal according to the second mask signal and the source output enable signal.

4. The source driving circuit according to claim 3, wherein the mask signal generation module includes:

a distinguishing unit coupled to a pulse signal terminal, the gate start signal terminal and the mode switching signal terminal, the distinguishing unit being configured to output a pair of row representation signals and a pair of frame representation signals according to a pulse signal from the pulse signal terminal, the gate start signal and the first mode switching signal, wherein the pair of row representation signals represent the odd-numbered row and the even-numbered row, and the pair of frame representation signals represent the odd-numbered frame and the even-numbered frame; and a generation unit coupled to the distinguishing unit, the generation unit being configured to generate the first mask signal and the second mask signal according to the pair of row representation signals, the pair of frame representation signals, and an inverted and delayed signal of the source output enable signal.

5. The source driving circuit according to claim 4, wherein the distinguishing unit includes:

a NAND gate, wherein a first input terminal of the NAND gate is coupled to the pulse signal terminal, and a second input terminal of the NAND gate is coupled to the gate start signal terminal;

a first NOT gate, wherein an input terminal of the first NOT gate is coupled to an output terminal of the NAND gate;

a first flip-flop, wherein an enable terminal of the first flip-flop is coupled to an output terminal of the first NOT gate, a reset terminal of the first flip-flop is coupled to the mode switching signal terminal, a first output terminal and a second output terminal of the first flip-flop are coupled to the generation unit, and an input terminal of the first flip-flop is coupled to the first output terminal of the first flip-flop; the first output terminal of the flip-flop is configured to output the first frame representation signal, and the second output terminal of the first flip-flop is configured to output the second frame representation signal; the first frame representation signal and the second frame representation signal are inverted, and constitute the pair of frame representation signals;

a first AND gate, wherein a first input terminal of the first AND gate is coupled to the output terminal of the NAND gate, and a second input terminal of the first AND gate is coupled to the mode switching signal terminal; and a second flip-flop, wherein an enable terminal of the second flip-flop is coupled to the pulse signal terminal, a reset terminal of the second flip-flop is coupled to an output terminal of the first AND gate, a first output terminal and a second output terminal of the second flip-flop are coupled to the generation unit, and an input terminal of the second flip-flop is coupled to the first output terminal of the second flip-flop; the first output terminal of the second flip-flop is configured to output a first row representation signal, and the second output terminal of the second flip-flop is configured to output a second row representation signal; the first row representation signal and the second row representation signal are inverted, and constitute the pair of row representation signals.

6. The source driving circuit according to claim 4, wherein the generation unit includes:

a multiplier, wherein a first input terminal and a second input terminal of the multiplier are coupled to the distinguishing unit, and are configured to receive the pair of row representation signals; and a third input terminal and a fourth input terminal of the multiplier are coupled to the distinguishing unit, and are configured to receive the pair of frame representation signals; and a third flip-flop, wherein an input terminal of the third flip-flop is coupled to an output of the multiplier, an enable terminal of the third flip-flop is configured to receive the inverted and delayed signal of the source output enable signal, and an output terminal of the third flip-flop is configured to output the first mask signal and the second mask signal.

7. The source driving circuit according to claim 3, wherein the latch signal generation module includes:

a second NOT gate, wherein an input terminal of the second NOT gate is coupled to the mask signal generation module; and a second AND gate, wherein a first input terminal of the second AND gate is coupled to an output terminal of the second NOT gate, a second input terminal of the second AND gate is coupled to the initial latch enable signal terminal, and an output terminal of the second AND gate is configured to output the first latch signal in the odd-numbered frame rand output the second latch signal in the even-numbered frame.

8. The source driving circuit according to claim 3, wherein the enable signal generation module includes:

a signal generator, wherein an input terminal of the signal generator is coupled to the source output enable signal terminal, and an enable terminal of the signal generator is coupled to the mask signal generation module; and an output terminal of the signal generator is configured to output the first enable signal and the second enable signal.

9. The source driving circuit according to claim 1, wherein the logic and control sub-circuit is further configured to receive and output the initial latch enable signal and the source output enable signal according to the gate start signal and a second mode switching signal from the mode switching signal terminal;

the latch sub-circuit is further configured to latch the odd-numbered row of data and the even-numbered row of data in the data signal in each frame under control of the initial latch enable signal; and the output sub-circuit is further configured to output the odd-numbered row of data and the even-numbered row of data under control of the source output enable signal.

10. The source driving circuit according to claim 1, further comprising:

a level conversion and digital-to-analog conversion sub-circuit coupled to the latch sub-circuit and the output sub-circuit, the level conversion and digital-to-analog conversion sub-circuit being configured to: receive the odd-numbered row of data in the odd-numbered frame, and perform level conversion and digital-to-analog conversion on the odd-numbered row of data; and receive the even-numbered row of data in the even-numbered frame, and perform the level conversion and digital-to-analog conversion on the even-numbered row of data.

11. The source driving circuit according to claim 1, further comprising:

an output buffer coupled to the latch sub-circuit and the output sub-circuit, the output buffer being configured to: receive the odd-numbered row of data in the odd-numbered frame, and temporarily store the odd-numbered row of data; and receive the even-numbered row of data in the even-numbered frame, and temporarily store the even-numbered row of data.

12. The source driving circuit according to claim 1, wherein the first set duration is equal to the second set duration.

13. A source driving method, comprising:

receiving a source data signal, and converting the source data signal into a data signal in each frame;

in an odd-numbered frame:

generating a first latch signal and a first enable signal according to a gate start signal, a first mode switching signal, an initial latch enable signal and a source output enable signal;

latching an odd-numbered row of data in the data signal under control of the first latch signal; and outputting the odd-numbered row of data in a first set duration under control of the first enable signal; the first set duration being greater than a charging time of sub-pixels in the even-numbered row, and being less than or equal to twice the charging time of the sub-pixels in the even-numbered row;

in an even-numbered frame:

generating a second latch signal and a second enable signal according to the gate start signal, the first mode switching signal, the initial latch enable signal and the source output enable signal;

latching an even-numbered row of data in the data signal under control of the second latch signal; and outputting the even-numbered row of data in a second set duration under control of the second enable signal; the second set duration being greater than a charging time of sub-pixels in the odd-numbered row, and being less than or equal to twice the charging time of the sub-pixels in the odd-numbered row.

14. The source driving method according to claim 13, wherein the first set duration is twice the charging time of the sub-pixels in the even-numbered row in the odd-numbered frame; and/or the second set duration is twice the charging time of the sub-pixels in the odd-numbered row in even-numbered frame.

15. The source driving method according to claim 13, wherein generating the first latch signal and the first enable signal according to the gate start signal, the first mode switching signal, the initial latch enable signal and the source output enable signal, includes:

generating a first mask signal according to the gate start signal and the first mode switching signal;

generating the first latch signal according to the first mask signal and the initial latch enable signal; and generating the first enable signal according to the first mask signal and the source output enable signal;

generating the second latch signal and the second enable signal according to the gate start signal, the first mode switching signal, the initial latch enable signal and the source output enable signal, includes:

generating a second mask signal according to the gate start signal and the first mode switching signal;

generating the second latch signal according to the second mask signal and the initial latch enable signal; and generating the second enable signal according to the second mask signal and the source output enable signal.

16. The source driving method of claim 15, wherein generating the first mask signal according to the gate start signal and the first mode switching signal, includes:

receiving a pulse signal, and generating a pair of row representation signals and a pair of frame representation signals according to the pulse signal, the gate start signal and the first mode switching signal, wherein the pair of row representation signals include a first row representation signal and a second row representation signal that are mutually inverted, and the pair of frame representation signals include a first frame representation signal and a second frame representation signal that are mutually inverted; and generating the first mask signal according to the pair of row representation signals, the pair of frame representation signals and an inverted and delayed signal of the source output enable signal;

generating the second mask signal according to the gate start signal and the first mode switching signal, includes:

receiving the pulse signal, and generating the pair of row representation signals and the pair of frame representation signals according to the pulse signal, the gate start signal and the first mode switching signal, wherein the pair of row representation signals include the first row representation signal and the second row representation signal that are mutually inverted, and the pair of frame representation signals include the first frame representation signal and the second frame representation signal that are mutually inverted; and generating the second mask signal according to the pair of row representation signals, the pair of frame representation signals and the inverted and delayed signal of the source output enable signal;

wherein the first row representation signal is at a low level in a time of the odd-numbered row and at a high level in a time of the even-numbered row; the first frame representation signal is at a low level in a time of the odd-numbered frame and at a high level in a time of the even-numbered frame; or the first row representation signal is at the high level in the time of the odd-numbered row and at the low level in the time of the even-numbered row; the first frame representation signal is at the high level in the time of the odd-numbered frame and at the low level in the time of the even-numbered frame.

17. A display device, comprising:

a plurality of source driving circuits each according to claim 1;

at least one timing control circuit configured to output the source data signal, the gate start signal, the first mode switching signal, a second mode switching signal, the initial latch enable signal and the source output enable signal; each timing control circuit is coupled to at least two source driving circuits; and a display panel coupled to the at least one timing control circuit and the plurality of the source driving circuits.

18. The display device according to claim 17, wherein the display device comprises two timing control circuits;

the plurality of source driving circuits are divided into two groups, and each group of source driving circuits are coupled to a timing control circuit in the two timing control circuits;

a refresh frequency of the timing control circuit is X, and an amount of image data that is capable of being transmitted in each frame is Y; a target refresh frequency of the display panel is $X_0$, and an amount of target image data that is required for each frame is $Y_0$; and a product of X and Y equals half a product of $X_0$ and $Y_0$ $$\left(X \times Y = \frac{X_0 \times Y_0}{2}\right).$$

19. A display driving method applied to the display device according to the claim 17, wherein the display driving method comprises:

in each frame, sending, by the timing control circuit, the source data signal, the gate start signal, the first mode switching signal, the initial latch enable signal and the source output enable signal to a source driving circuit in the plurality of source driving circuits; and converting, by the source driving circuit, the source data signal into the data signal;

in the odd-numbered frame:

latching, by the source driving circuit, the odd-numbered row of data in the data signal according to the gate start signal, the first mode switching signal, the initial latch enable signal and the source output enable signal; and outputting, by the source driving circuit, the odd-numbered row of data in the first set duration; and controlling, by the timing control circuit, sub-pixels in rows of the display panel to be turned on row by row, and charging the sub-pixels in the rows of the display panel by using the odd-numbered row of data; the charging time of the sub-pixels in the odd-numbered row being the first set duration, and the charging time of the sub-pixels in the even-numbered row being greater than or equal to half the first set duration and less than the first set duration;

in the even-numbered frame:

latching, by the source driving circuit, the even-numbered row of data in the data signal according to the gate start signal, the first mode switching signal, the initial latch enable signal and the source output enable signal; and outputting, by the source driving circuit, the even-numbered row of data in the second set duration; and controlling, by the timing control circuit, the sub-pixels in the rows of the display panel to be turned on row by row, and charging the sub-pixels in the rows of the display panel by using the even-numbered row of data; the charging time of the sub-pixels in the even-numbered row being the second set duration, and the charging time of the sub-pixels in the odd-numbered row being greater than or equal to half the second set duration and less than the second set duration.

20. The display driving method according to claim 19, wherein in the odd-numbered frame, for sub-pixels in two adjacent rows, when a charging time of sub-pixels in an odd-numbered row in the two adjacent rows reaches half the first set duration, sub-pixels in an even-numbered row in the two adjacent rows of are turned on for charging; and in the even-numbered frame, for the sub-pixels in the two adjacent rows, when a charging time of the sub-pixels in the even-numbered row in the two adjacent rows reaches half of the second set duration, the sub-pixels in the odd-numbered row are turned on for charging.

* * * * *